(12) United States Patent
Fang et al.

(10) Patent No.: US 11,875,023 B2
(45) Date of Patent: Jan. 16, 2024

(54) METHOD AND APPARATUS FOR OPERATING USER INTERFACE, ELECTRONIC DEVICE, AND STORAGE MEDIUM

(71) Applicant: Beijing Bytedance Network Technology Co., Ltd., Beijing (CN)

(72) Inventors: Chi Fang, Beijing (CN); Hengyi Hu, Beijing (CN); Jie Zhuang, Beijing (CN); Haizhou Zhu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/753,296

(22) PCT Filed: Aug. 17, 2020

(86) PCT No.: PCT/CN2020/109452
§ 371 (c)(1),
(2) Date: Feb. 25, 2022

(87) PCT Pub. No.: WO2021/082639
PCT Pub. Date: May 6, 2021

(65) Prior Publication Data
US 2022/0326823 A1 Oct. 13, 2022

(30) Foreign Application Priority Data
Oct. 31, 2019 (CN) .......................... 201911063011.3

(51) Int. Cl.
*G06F 3/048* (2013.01)
*G06F 3/0484* (2022.01)
(Continued)

(52) U.S. Cl.
CPC .......... *G06F 3/0484* (2013.01); *G06F 3/0482* (2013.01); *G06T 3/4038* (2013.01); *H04N 5/76* (2013.01); *G06T 2200/24* (2013.01)

(58) Field of Classification Search
CPC ...... G06F 9/451; G06F 16/743; G06F 3/0482; G06F 3/0481; G06F 3/0484; G06F 3/04847; G06F 16/447; G06V 20/40
See application file for complete search history.

(56) References Cited

U.S. PATENT DOCUMENTS 6,264,198 B1 * 7/2001 Stamper .................. A63F 13/54
463/31
8,600,824 B2 * 12/2013 Sunkada ................ G06Q 30/02
705/26.4
(Continued)

FOREIGN PATENT DOCUMENTS

| CN | 104820549 A | 8/2015 |
|---|---|---|
| CN | 105447900 A | 3/2016 |

(Continued)

OTHER PUBLICATIONS

International Search Report and Written Opinion for International Application No. PCT/CN2020/109452, dated Nov. 19, 2020 (17 pages).

(Continued)

*Primary Examiner* — Steven B Theriault
(74) *Attorney, Agent, or Firm* — ARENTFOX SCHIFF LLP

(57) ABSTRACT

A method and apparatus for operating an electronic device, a terminal device, and a computer readable storage medium. The method for operating an electronic device comprises: determining whether a screenshot start condition is satisfied (S101); in response to determining that the screenshot start condition is satisfied, performing automatic screenshot on a user interface of the electronic device to obtain a plurality of (Continued)

screenshots associated with the user interface of the electronic device (S102); and in response to determining that a screenshot stop condition is satisfied, stopping the automatic screenshot on the user interface of the electronic device (S103).

20 Claims, 7 Drawing Sheets

(51) Int. Cl.
      *G06F 3/0482*       (2013.01)
      *G06T 3/40*       (2006.01)
      *H04N 5/76*       (2006.01)

(56) References Cited

U.S. PATENT DOCUMENTS

| | | | | |
|---|---|---|---|---|
| 8,856,215 | B2* | 10/2014 | Brown | G06Q 30/02 709/203 |
| 9,514,100 | B2* | 12/2016 | Li | H04N 21/41407 |
| 9,529,520 | B2* | 12/2016 | Cha | G06F 9/4416 |
| 2006/0033820 | A1* | 2/2006 | Honda | G06T 11/60 348/E5.058 |
| 2006/0059460 | A1* | 3/2006 | Phillips | G06F 8/70 717/109 |
| 2008/0235339 | A1* | 9/2008 | Lurey | G06F 16/954 707/999.005 |
| 2009/0043646 | A1* | 2/2009 | Pingali | G06F 11/3476 705/7.27 |
| 2009/0209335 | A1* | 8/2009 | Pearce | H04L 67/02 463/30 |
| 2011/0047462 | A1* | 2/2011 | Butin | G06F 11/3414 715/708 |
| 2011/0047488 | A1* | 2/2011 | Butin | G06F 3/04842 715/762 |
| 2011/0047514 | A1* | 2/2011 | Butin | G06F 9/453 715/862 |
| 2012/0044137 | A1* | 2/2012 | Oddiraju | H04N 5/4448 345/530 |
| 2012/0159348 | A1* | 6/2012 | Stroomer | G06F 3/0481 715/751 |
| 2012/0169762 | A1* | 7/2012 | Kocjan | G06F 21/6209 345/619 |
| 2012/0271867 | A1* | 10/2012 | Grossman | G06F 16/93 707/821 |
| 2012/0284297 | A1* | 11/2012 | Aguera-Arcas | G06F 3/03547 713/1 |
| 2013/0053007 | A1* | 2/2013 | Cosman | G06F 3/017 455/414.3 |
| 2013/0227471 | A1* | 8/2013 | Cha | G06F 3/0484 715/790 |
| 2013/0283318 | A1* | 10/2013 | Wannamaker | H04N 21/23424 725/56 |
| 2013/0342730 | A1 | 12/2013 | Lee et al. | |
| 2013/0343729 | A1* | 12/2013 | Rav-Acha | H04N 9/87 386/285 |
| 2014/0019865 | A1* | 1/2014 | Shah | G06F 3/0484 715/731 |
| 2014/0089145 | A1* | 3/2014 | Sunkada | G06Q 30/02 705/26.63 |
| 2014/0115454 | A1* | 4/2014 | Li | H04N 21/4122 715/273 |
| 2014/0118597 | A1* | 5/2014 | Tabak | H04N 23/634 348/333.02 |
| 2014/0125590 | A1* | 5/2014 | Flagg | A63F 13/2145 345/157 |
| 2014/0157113 | A1* | 6/2014 | Krishna | G06F 40/58 715/249 |
| 2014/0270550 | A1* | 9/2014 | Dwan | G06F 18/22 382/225 |
| 2014/0298449 | A1* | 10/2014 | Low | G06F 3/048 726/19 |
| 2014/0327831 | A1* | 11/2014 | Liu | G06F 3/04845 348/659 |
| 2014/0358919 | A1* | 12/2014 | Chandra | G06F 16/285 707/737 |
| 2015/0106500 | A1* | 4/2015 | Fakhouri | H04L 67/34 709/224 |
| 2015/0128017 | A1* | 5/2015 | Fithian | G06F 40/134 715/205 |
| 2015/0186511 | A1* | 7/2015 | Trollope | G06F 16/632 707/769 |
| 2015/0278180 | A1* | 10/2015 | Nicholas, Jr. | G06F 3/04883 715/230 |
| 2015/0286281 | A1* | 10/2015 | Fang | G06F 3/04883 715/863 |
| 2016/0092180 | A1* | 3/2016 | Straub | G06T 11/60 715/762 |
| 2016/0203577 | A1* | 7/2016 | Bell | G07F 17/3223 715/753 |
| 2016/0210222 | A1* | 7/2016 | Wyld | G06F 11/3672 |
| 2016/0249106 | A1* | 8/2016 | Lachwani | H04N 21/234363 |
| 2016/0260143 | A1* | 9/2016 | Ekambaram | G06F 3/012 |
| 2017/0068829 | A1* | 3/2017 | Shaw | G06F 21/50 |
| 2017/0153886 | A1* | 6/2017 | Singh | G06F 8/71 |
| 2017/0164058 | A1* | 6/2017 | Garcia Navarro | H04N 21/4325 |
| 2017/0249069 | A1* | 8/2017 | Zamir | G06F 9/461 |
| 2017/0280200 | A1* | 9/2017 | Sharma | H04N 21/4788 |
| 2018/0008896 | A1* | 1/2018 | Selinger | A63F 9/0612 |
| 2018/0046341 | A1* | 2/2018 | Lee | G06F 3/04883 |
| 2018/0074685 | A1* | 3/2018 | Peng | G06F 3/0483 |
| 2018/0255341 | A1* | 9/2018 | Deng | G06F 16/743 |
| 2018/0284981 | A1* | 10/2018 | Lu | G06F 3/04883 |
| 2018/0342037 | A1* | 11/2018 | Sun | G06Q 30/0633 |
| 2019/0141496 | A1* | 5/2019 | Laster | H04W 4/029 |
| 2019/0196674 | A1* | 6/2019 | Baig | G06F 3/0482 |
| 2020/0050349 | A1* | 2/2020 | Wang | G06F 3/0485 |
| 2020/0073903 | A1* | 3/2020 | Jain | G06F 40/117 |
| 2020/0159370 | A1* | 5/2020 | Lees | G06F 16/957 |
| 2021/0073937 | A1* | 3/2021 | Werner | H04N 1/4074 |
| 2021/0352348 | A1* | 11/2021 | Reid | G06F 3/017 |
| 2022/0329686 | A1* | 10/2022 | Takura | G06F 3/0482 |

FOREIGN PATENT DOCUMENTS

| | | |
|---|---|---|
| CN | 105653155 A | 6/2016 |
| CN | 107168625 A | 9/2017 |
| CN | 107194898 A | 9/2017 |
| CN | 107682650 A | 2/2018 |
| CN | 109040419 A | 12/2018 |
| CN | 109120982 A | 1/2019 |
| CN | 110825289 A | 2/2020 |

OTHER PUBLICATIONS

First Office Action for Chinese Application No. 201911063011.3, dated Oct. 26, 2020 (38 pages).

Second Office Action for Chinese Application No. 201911063011.3, dated May 17, 2021 (34 pages).

* cited by examiner

METHOD AND APPARATUS FOR OPERATING USER INTERFACE, ELECTRONIC DEVICE, AND STORAGE MEDIUM

This application is a 35 U.S.C. § 371 National Phase of PCT Application No. PCT/CN2020/109452, filed on Aug. 17, 2020, which claims priority to Chinese Patent Application No. 201911063011.3, filed Oct. 31, 2019, the disclosures of each of which are hereby incorporated by reference in their entireties.

TECHNICAL FIELD

The present disclosure relates to the technical field of user interface processing, in particular to a method and an apparatus for operating an electronic device, an electronic device, and a storage medium.

BACKGROUND

In a related art, a user may expect to take a screenshot of the user interface of an electronic device during the user's use of the electronic device (for example, when the user is watching a video played on the electronic device or wants to share his/her operation on the electronic device with others). Although the operations of taking screenshots may be different for user interfaces of different electronic devices, the user's operations of taking screenshots of user interface of electronic devices may affect the current operation of the user, which will bring inconvenience to the user.

Methods described in this part are not necessarily those that have been previously envisaged or adopted. Unless otherwise specified, it shall not be assumed that any method described in this part is considered as prior art only because it is comprised in this part. Similarly, unless otherwise specified, the problems mentioned in this part shall not be considered to have been recognized in any prior art.

SUMMARY

According to a first aspect of the present disclosure, a method for operating an electronic device is provided. The method comprises: determining whether a screenshot start condition is satisfied; performing automatic screenshot on a user interface of the electronic device to obtain a plurality of screenshots associated with the user interface of the electronic device in response to determining that the screenshot start condition is satisfied; and stopping the automatic screenshot on the user interface of the electronic device in response to determining that a screenshot stop condition is satisfied.

According to a second aspect of the present disclosure, a device for operating an electronic device is provided. The device comprises: a determination unit configured to determine whether a screenshot start condition is satisfied; a screenshot unit configured to perform automatic screenshot on a user interface of the electronic device to obtain a plurality of screenshots associated with the user interface of the electronic device; and a stopping unit configured to stop the automatic screenshot on the user interface of the electronic device in response to determining that a screenshot stop condition is satisfied.

According to a third aspect of the present disclosure, an electronic device is provided. The electronic device comprises: a processor; and a memory storing a program, the program comprising instructions that, when executed by the processor, cause the processor to perform the method for operating the electronic device described in the present disclosure.

According to a fourth aspect of the present disclosure, there is provided a computer-readable storage medium for storing a program, the program comprising instructions that, when executed by a processor of an electronic device, cause the electronic device to perform the method for operating the electronic device described in the present disclosure.

According to a fifth aspect of the present disclosure, there is provided a computer program product comprising a program, the program comprising codes that, when executed by a processor of an electronic device, cause the electronic device to perform the method for operating the electronic device described in the present disclosure.

BRIEF DESCRIPTION OF THE DRAWINGS

The accompanying drawings exemplarily show some embodiments and constitute part of the description, and together with the text of the description serve to explain exemplary implementations of the embodiments. The illustrated embodiments are for illustrative purposes only, and are not intended to limit the scope of the claims. In all the drawings, the same reference numeral refers to similar but not necessarily the same element.

DETAILED DESCRIPTION

Figure 1:
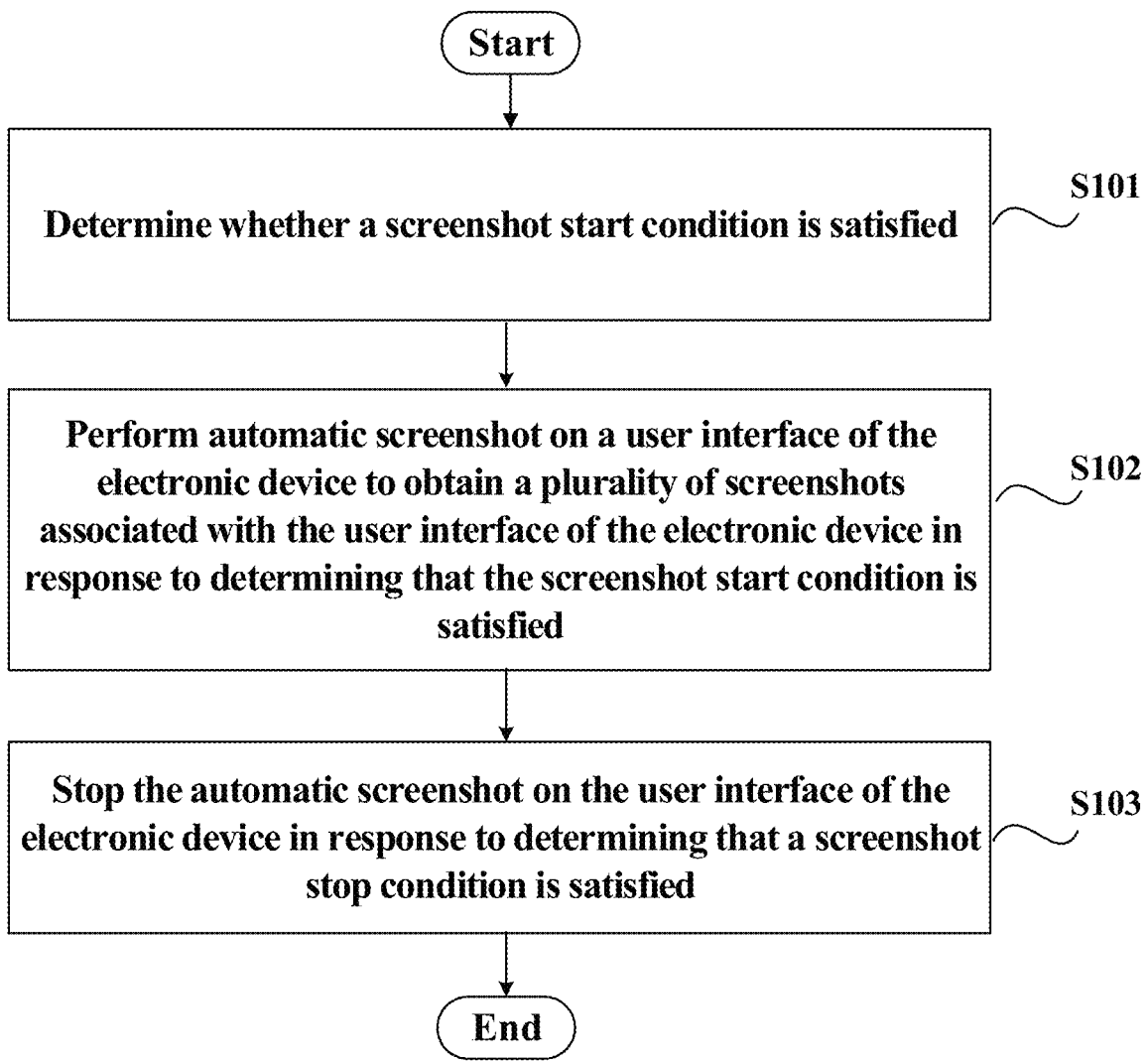
FIG. 1 is a flowchart showing a method for operating an electronic device according to an exemplary embodiment of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods embodiments may comprise additional steps and/or illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that in the present disclosure, unless otherwise specified, the terms "first", "second" and the like are used to describe various elements. These terms are not intended to limit the positional relationship, temporal relationship or importance relationship of these elements, but are only used to distinguish one element from another. In some examples, a first element and a second element may refer to the same instance of the element, and in some cases, they can refer to different instances based on the context of the description.

In addition, the terms used in the description of various examples in the present disclosure are only for the purpose of describing specific examples, but are not intended to be limiting. Unless otherwise expressly stated in the context, if the number of elements is not specifically specified, there may be one or more of the elements. In addition, the term "and/or" as used in the present disclosure covers any and all possible combinations of the listed items.

Further, it should be noted that the titles of messages or information exchanged between multiple devices in the embodiment of the present disclosure are only for illustrative purposes, and are not for limiting the scope of these messages or information.

In the present disclosure, an "electronic device" may be any type of electronic device, such as, but not limited to, a mobile terminal such as a mobile phone, a laptop, a digital broadcast receiver, a PDA (personal digital assistant), a PAD (tablet computer), a PMP (portable multimedia player), a vehicle terminal (such as vehicle navigation terminal), or a fixed terminal such as a digital TV, a desktop computer, etc.

In the present disclosure, a "window" is a medium in which a code or a program is displayed on a user interface of an electronic device. In particular, an "application" can be displayed on the user interface of the electronic device through an "application window".

In the related art, a user may expect to take a screenshot of the user interface of an electronic device during the user's use of the electronic device (for example, when the user is watching a video played on the electronic device or wants to share his/her operation on the electronic device with others). Although the operations of taking screenshots may be different for the user interfaces of different electronic devices, the user's operations of taking screenshots of user interface of electronic devices may affect the current operation of the user, which will bring inconvenience to the user.

In view of this, the present disclosure provides a method for operating an electronic device. According to the method for operating the electronic device of the present disclosure, automatic screenshot can be carried out for the user interface of the electronic device to obtain a plurality of screenshots associated with the user interface of the electronic device for subsequent operation by the user. This makes it possible to perform an automatic screenshot function when a screenshot start condition is satisfied, which can simplify the user's operation. In addition, the method for operating the electronic device according to the present disclosure can perform automatic screenshot on the user interface of the electronic device without requiring the user to manually perform screenshot according to operation specifications of different electronic devices, such that a current operation of the user will not be affected in the screenshot process.

An exemplary embodiment of the method for operating an electronic device will be further described below in conjunction with the accompanying drawings.

Referring to FIG. 1, a first aspect of the present disclosure comprises a method for operating an electronic device, comprising: determining whether a screenshot start condition is satisfied (S101); performing automatic screenshot on a user interface of the electronic device to obtain a plurality of screenshots associated with the user interface of the electronic device in response to determining that the screenshot start condition is satisfied (S102); and stopping the automatic screenshot on the user interface of the electronic device in response to determining that a screenshot stop condition is satisfied (S103).

In step S101, according to some embodiments, it is determined by an electronic device whether the screenshot start condition is satisfied. According to some embodiments, the screenshot start condition is a screenshot start input for a user interface of the electronic device performed by the user. According to some embodiments, the screenshot start condition is a screenshot start input for a physical button of the electronic device performed by the user. According to some embodiments, the screenshot start condition may be independent of a user input. How to determine whether a screenshot start condition is satisfied will be described below.

In step S102, according to some embodiments, the automatic screenshot (also referred to as screen capture) of the user interface of the electronic device is automatically performed by the electronic device without manual operation of the user.

According to some embodiments, the automatic screenshot is performed for the full user interface of the electronic device. According to other embodiments, the automatic screenshot is performed for a part of the user interface of the electronic device. For example, a black edge area of a video can be automatically filtered out in a screenshot processing of the video.

In the related art, a screenshot animation is usually displayed for the screenshot of a user interface of an electronic device.

According to some embodiments, the screenshot animation is not displayed on the user interface of the electronic device when the automatic screenshot is performed for the user interface of the electronic device.

In this way, during the screenshot process, a current display content on the user interface of the electronic device will not be disturbed by the screenshot animation that may affect the user's current operation on the electronic device, and thereby the user's visual experience can be improved.

In the related art, a screenshot sound effect is usually produced for the screenshot of a user interface of an electronic device.

According to some embodiments, the screenshot sound effect is not produced by the electronic device when the automatic screenshot is performed for the user interface of the electronic device.

In this way, during the screenshot process, a current playback content of an audio output device of the electronic device will not be disturbed by a screenshot sound effect that may affect the user, and thereby the user's auditory experience can be improved.

In step S103, according to some embodiments, it is determined by an electronic device whether a screenshot stop condition is satisfied. According to some embodiments, the screenshot stop condition is a screenshot stop input performed by a user for the user interface of the electronic device. According to some embodiments, the screenshot stop condition is a screenshot stop input performed by the user for the physical button of the electronic device. According to some embodiments, the screenshot stop condition may be independent of a user input. How to determine whether a screenshot stop condition is satisfied will be described below.

According to some embodiments, thumbnails of the plurality of screenshots and/or a thumbnail of the video are displayed directly on the user interface of the electronic device in response to determining that the screenshot stop condition is satisfied. According to other embodiments, in response to determining that an audio recording stop condition is satisfied, instead of directly displaying the thumbnails of the plurality of screenshots and/or the thumbnail of the video, the thumbnails of the plurality of screenshots and/or the thumbnail of the video are saved in a temporary folder for subsequent operation of the user.

According to some embodiments, the user interface of the electronic device is a touch sensitive user interface.

How to determine whether a screenshot start condition is satisfied in step S101 will be described below.

According to some embodiments, the determining of whether the screenshot start condition is satisfied comprises: determining that the screenshot start condition is satisfied in response to receiving an automatic screenshot indication input for the user interface of the electronic device.

According to some embodiments, the automatic screenshot indication input comprises a click input, a press input, a slide input, a lift input, or a combination thereof. According to some embodiments, the automatic screenshot indication input comprises one input, such as a click input for a screen recording and screenshot button, or a press input at a certain location of the user interface, etc. According to other embodiments, the automatic screenshot indication input comprises a plurality of inputs. An automatic screenshot indication input that comprises a plurality of inputs will be described in detail later.

In some cases, a state of the user interface of the electronic device can be determined when the user interface of the electronic device receives the automatic screenshot indication input.

According to some embodiments, the method further comprises: receiving an automatic screenshot indication input for the user interface of the electronic device; wherein the determining of whether the screenshot start condition is satisfied comprises: determining whether the user interface of the electronic device displays an application window when receiving the automatic screenshot indication input; determining whether the application window is allowed to be screen-captured in response to determining that the user interface of the electronic device displays the application window when receiving the automatic screenshot indication input; and determining that the screenshot start condition is satisfied in response to determining that the application window is allowed to be screen-captured.

According to some embodiments, the user interface of the electronic device may be displaying an application window, a system desktop, a task manager window, etc. when receiving the automatic screenshot indication input.

It can be further determined whether the application window is allowed to be screen-captured in a case where the user interface of the electronic device displays an application window when receiving the automatic screenshot indication input.

In some cases, the application window is allowed to be screen-captured. In these cases, it can be determined that the screenshot start condition is satisfied in a case where the user interface displays the application window when receiving the automatic screenshot indication input.

In other cases, the application window is not allowed to be screen-captured. According to some embodiments, the developer of an application window may not allow screenshot for the application window (for example, for copyright or privacy reasons). According to some embodiments, a user sets an application window to not allow screenshots. The user may set the application window to not allow screenshots since he/she does not want to be disturbed when operating on the application window. For example, an application window that can be set by the user to not allow screenshots is a game application window. Therefore, it can be determined that the screenshot start condition is not satisfied in a case where the user interface displays an application window that is not allowed to be screen-captured when receiving the automatic screenshot indication input.

In this way, it can be determined whether it can be further determined whether the application window is allowed to be screen-captured based on whether the user interface displays an application window when receiving the automatic screenshot indication input. For an application window that is not allowed to be screen-captured, if an automatic screenshot indication input is received on the application window (for example, in the event of user's misoperation or if an input method of the automatic screenshot indication input is the same as an input method of an operation in the displayed application window, etc.), the electronic device will not start screenshot in response to the automatic screenshot indication input, which can make the response to the automatic screenshot indication input more accurate, thereby improving the user's experience.

According to some embodiments, the determining of whether the screenshot start condition is satisfied further comprises: determining that the screenshot start condition is satisfied in response to determining that the user interface of the electronic device does not displays the application window when receiving the automatic screenshot indication input.

According to some embodiments, instead of an application window, the user interface of the electronic device displays other windows such as a desktop window, a task manager window, etc. when receiving the automatic screenshot indication input. In these cases, since there is no problem about disturbing the user, the electronic device can directly determine that the screenshot start condition is satisfied, and then start automatic screenshot, thereby simplifying the step of determining whether the screenshot start condition is satisfied.

As described above, the automatic screenshot indication input may comprise a single input or a plurality of inputs.

Figure 2:
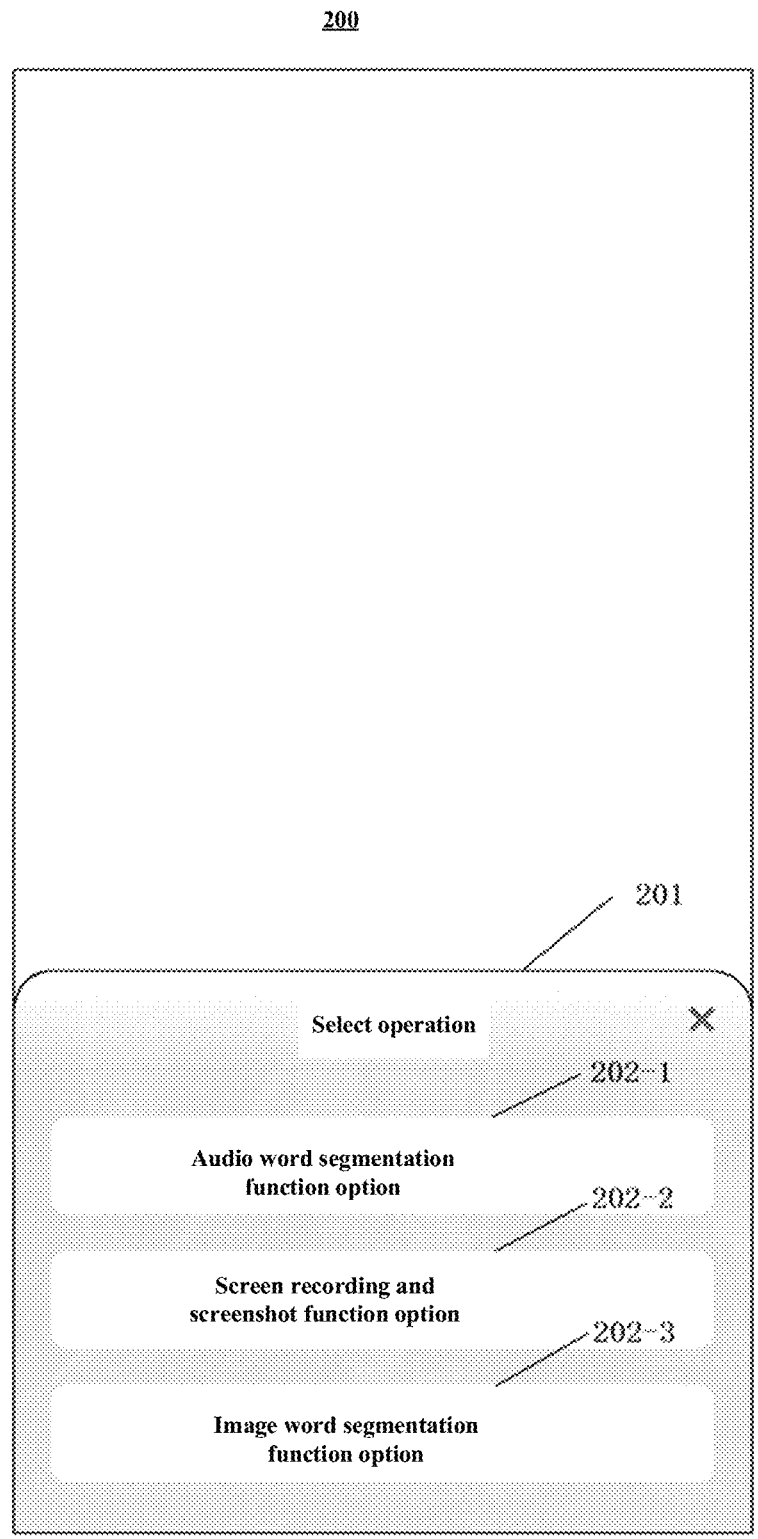
FIG. 2 is a schematic diagram showing an example of a user interface for determining whether a screenshot start condition is satisfied according to an exemplary embodiment of the present disclosure.

According to some embodiments, the receiving of the automatic screenshot indication input for the user interface of the electronic device comprises: receiving a function menu call-out input for the user interface of the electronic device; displaying a function selection menu on the user interface of the electronic device in response to receiving the function menu call-out input, wherein the function selection menu comprises a screen recording and screenshot function option; and receiving a selection for the screen recording and screenshot function option.function selection menu-function selection menu FIG. 2 is a schematic diagram showing an example of a user interface 200 for determining whether a screenshot start condition is satisfied according to an exemplary embodiment of the present disclosure. How to determine the screenshot start condition by providing a function selection menu and selecting a function option from the function option menu will be described below with reference to FIG. 2.

According to some embodiments, the automatic screenshot indication input comprises two inputs. A first input of the automatic screenshot indication input comprises an function menu call-out input for the user interface of the electronic device. Referring to FIG. 2, a function selection menu 201 is displayed on the user interface of the electronic device in response to receiving the function menu call-out input (for example, a click input on a function menu call-out button, a press input on the user interface, a slide input upward from the lower edge of the user interface of the electronic device, etc.). According to some embodiments, the function selection menu 201 comprises a plurality of function options. According to the example shown in FIG. 2, the function selection menu 201 comprises three function options, namely, audio word segmentation function option 202-1, screen recording and screenshot function option 202-2, and image word segmentation function option 202-3. Certainly, the present disclosure is not limited to this, and the function selection menu may comprise any number of function options. The user can select a function option from the function menu 201. According to some embodiments, the automatic screenshot indication input further comprises a selection for the screen recording and screenshot function option 202-2 as a second input of the automatic screenshot indication input.

In this way, two inputs can be used to determine whether the screenshot start condition is satisfied, which can provide the user with more opportunities for determination and longer time for consideration, and can prevent the user from unintentionally starting automatic screenshot due to misoperation.

According to some embodiments, the method further comprises: receiving an automatic screenshot indication input for the user interface of the electronic device; wherein the determining of whether the screenshot start condition is satisfied comprises: obtaining a location of the automatic screenshot indication input on the user interface of the electronic device; determining whether the user interface of the electronic device at the location belongs to a text extractable area; and determining that the screenshot start condition is satisfied in response to determining that the user interface of the electronic device at the location does not belong to the text extractable area.

According to some embodiments, the user interface of the electronic device comprises a text extractable area and a non-text extractable area. The text extractable area refers to an area where text can be selected in response to a text extraction input, for example, an area where text sessions are located in a chat application, or an area where a body of text is located in a mailbox application, etc. The non-text extractable area refers to an area where text cannot be selected in response to the text extraction input, such as an area where pictures are located on the system desktop or in an album application. The text extraction input may comprise a click input, a press input, a slide input, a lift input, or a combination thereof on a text extractable area. It can be seen that the text extraction input may overlap with the automatic screenshot indication input.

According to some embodiments, if the location of the automatic screenshot indication input on the user interface of the electronic device does not belong to a text extractable area, it is determined that the screenshot start condition is satisfied, and then screenshot is started. In this way, the screenshot start condition can be determined more accurately without interfering with a text extraction input, and thereby the user's experience can be improved.

According to some embodiments, as described above, in the case where the automatic screenshot indication input comprises a plurality of inputs (i.e., an function menu call-out input and an input for selecting a screen recording and screenshot function option), the obtaining of the location of the automatic screenshot indication input on the user interface of the electronic device comprises: obtaining a location of the function menu call-out input on the user interface of the electronic device. According to some embodiments, it is determined that the function selection menu can be displayed in response to determining that the function menu call-out input as the first input of the automatic screenshot indication input does not belong to the text extractable area. Then, a screen recording and screenshot function option as a second input of the automatic screenshot indication input is selected from the function selection menu.

In this way, in order to satisfy the screenshot start condition, misoperation for the text extractable area can be excluded by a function menu call-out input as the first input of the automatic screenshot indication input, and it is confirmed that the user wants to start automatic screenshot by a screen recording and screenshot function option as the second input of the automatic screenshot indication input, so that the accuracy of the determination of whether the screenshot start condition is satisfied can be further increased, and thereby user's experience can be improved.

According to some embodiments, the method further comprises: displaying a function selection menu on the user interface of the electronic device in response to determining that the user interface of the electronic device at the location belongs to the text extractable area, wherein the function selection menu comprises a screen recording and screenshot function option; receiving a selection for the screen recording and screenshot function option; and determining that the screenshot start condition is satisfied in response to receiving the selection for the screen recording and screenshot function option.

According to some embodiments, in a case where it is determined that the location of the automatic screenshot indication input (e. g., a press input) belongs to the text extractable area, it is impossible to determine whether the user wants to perform text extraction or automatic screenshot as described in the present disclosure. Therefore, according to some embodiments, when a press operation on part or whole of the text extractable area is received from the user, a function selection menu can be displayed (e.g., popped up) on the user interface for the user to further confirm the operation expected to be performed by the electronic device. According to some embodiments, the function selection menu comprises, for example, a screen recording and screenshot function option, an audio word segmentation function option, an image word segmentation function option, a text word segmentation function option, and a text extraction function option, etc. According to some embodiments, the user can select the screen recording and screenshot function option (for example, by clicking the screen recording and screenshot function option, pressing the screen recording and screenshot function option, sliding on the screen recording and screenshot function option, or the like), and it is determined that the screenshot start condition is satisfied after the user selects the screen recording and screenshot function option.

In this way, even if the location of the user's automatic screenshot indication input is within the text extractable area, the possibility that the user wishes to perform automatic screenshot will not be completely excluded, but it is possible for the user to make a further selection by displaying a function selection menu. When the user selects the screen recording and screenshot function option associated with automatic screenshot, the electronic device can still perform the function of automatic screenshot.

An exemplary way of the automatic screenshot in step S102 will be described in detail below in conjunction with an exemplary embodiment of the present disclosure.

According to some embodiments, the performing of the automatic screenshot on the user interface of the electronic device comprises: performing the automatic screenshot on the user interface of the electronic device at a preset time interval. According to some examples, the preset time interval can be once every 0.1 seconds, once every 0.2 seconds, once every 0.3 seconds, once every 0.4 seconds, once every 0.8 seconds, or once every 1 second, etc.

In the related art, manual screenshot can only be performed on a user interface of an electronic device at a lower frequency due to the limited manual operation speed. However, the method for operating an electronic device according to the present disclosure can achieve high-speed automatic screenshot.

In addition, in the related art, manual screenshot is performed on a user interface of an electronic device at an unstable frequency due to the limited capability for controlling. However, the method for operating an electronic device according to the present disclosure can achieve screenshot at a uniform speed, and the frequency of the automatic screenshot can be adjusted as needed (to be described in detail below).

In some cases, it may be desired to perform automatic screenshot on the user interface of the electronic device in a relative long duration, and at the same time, more screenshots will be obtained.

According to some embodiments, the performing of the automatic screenshot on the user interface of the electronic device comprises: obtaining elapsed time for the automatic screenshot on the user interface of the electronic device in real time; and adjusting dynamically a time interval for the automatic screenshot on the user interface of the electronic device based on the elapsed time obtained in real time.

According to some embodiments, the elapsed time for the automatic screenshot on the user interface of the electronic device can be obtained in real time by means of a timer of the electronic device. The elapsed time may be a time elapsed from the time when automatic screenshot on the user interface of the electronic device is started to a current time.

In this way, the time interval of automatic screenshot (i.e., the rate of automatic screenshot) can be adjusted according to the elapsed time. Compared with manual screenshot in the related art, automatic screenshot on the user interface of the electronic device according to the exemplary embodiment of the present disclosure is controllable.

According to some embodiments, when the elapsed time is shorter, automatic screenshot on the user interface of the electronic device can be performed at less time interval; when the elapsed time is larger, automatic screenshot on the user interface of the electronic device can be performed at a greater time interval.

According to some embodiments, the adjusting dynamically of the time interval for the automatic screenshot on the user interface of the electronic device based on the elapsed time obtained in real time comprises: performing the automatic screenshot on the user interface of the electronic device at a first time interval when the elapsed time obtained in real time is within a first range; and performing the automatic screenshot on the user interface of the electronic device at a second time interval when the elapsed time obtained in real time is within a second range, wherein values in the first range are all less than values in the second range, and the first time interval is less than the second time interval.

According to some examples, the first range is (0 s, 15 s] (i.e., the elapsed time is greater than 0 s and less than or equal to 15 s), and the second range is (15 s, 30 s] (i.e., the elapsed time is greater than 15 s and less than or equal to 30 s). According to some examples, the first time interval may be once every 0.2 s and the second time interval may be once every 0.4 s. In other words, the user interface of the electronic device can be captured once every 0.2 s when the elapsed time for the automatic screenshot on the user interface of the electronic device does not exceed 15 s; the user interface of the electronic device can be captured once every 0.4 s when the elapsed time for the automatic screenshot on the user interface of the electronic device exceeds 15 s but does not exceed 30 s.

According to some embodiments, the adjusting dynamically of the time interval for the automatic screenshot on the user interface of the electronic device based on the elapsed time obtained in real time comprises: performing the automatic screenshot on the user interface of the electronic device at a third time interval when the elapsed time obtained in real time is within a third range, wherein values in the second range are all less than values in the third range, and the second time interval is less than the third time interval.

According to some examples, the third range is (30 s, +∞) (i.e. the elapsed time is greater than 30 seconds), and the third time interval is once every 0.8 seconds. In other words, the user interface of the electronic device can be captured once every 0.2 s when the elapsed time for the automatic screenshot on the user interface of the electronic device exceeds 30 s.

The above describes some examples according to an exemplary embodiment of the present disclosure. Those skilled in the art should know that the first range, the second range, the third range, the first time interval, the second time interval and the third time interval can be changed according to actual situations, and the exemplary embodiment of the present disclosure can also comprise a fourth range, a fifth range, a fourth time interval, and a fifth time interval, etc.

In this way, the longer the elapsed time for the automatic screenshot on the user interface of the electronic device, the longer the time interval for the automatic screenshot on the user interface of the electronic device. In the event of a long elapsed time, this can avoid the acquisition of too many screenshots, making it more convenient for the user to perform subsequent operations on these screenshots (for example, filtering the screenshots).

In some cases, a plurality of screenshots associated with the user interface of the electronic device obtained according to the method of dynamically adjusting the time interval for automatic screenshot described above may be uneven in time.

According to the examples described above, the first range is (0 s, 15 s] (i.e., the elapsed time is greater than 0 s and less than or equal to 15 s), the second range is (15 s, 30 s] (i.e., the elapsed time is greater than 15 s and less than or equal to 30 s), the first time interval is once every 0.2 s, and the second time interval is once every 0.4 s, and the elapsed time obtained in real time is 30 s. During the 30 s screenshot of the user interface of the electronic device, 75 (15 s/0.2 s) screenshots associated with the user interface of the electronic device are obtained when the elapsed time is within in the first range (i.e., the first 15 s). 37 (a rounded value of 15 s/0.4 s)) screenshots associated with the user interface of the electronic device are obtained when the elapsed time is within in the first range (i.e., the first 15 s).

According to some embodiments, the second time interval is N times the first time interval, wherein N is a positive integer greater than 1, and the method further comprises: retaining one of screenshots and deleting other screenshots for every N screenshots associated with the user interface of the electronic device that are obtained in a state where the elapsed time is within the first range when the elapsed time obtained in real time is in the second range.

According to some examples described above, it can be seen that the second time interval is twice the first time interval. Therefore, for every two screenshots associated with the user interface of the electronic device that are obtained when the elapsed time is within the first range (e.g., the first 15 s), one of these screenshots is retained and the other one is deleted. According to some examples described above, from the 75 screenshots associated with the user interface of the electronic device that are obtained within the first 15 s, one screenshot is retained for every two screenshots and the other is deleted. According to some examples, the 75 screenshots can be numbered in chronological order, wherein the even numbered screenshots can be retained, and the odd numbered screenshots can be deleted. For the 37 screenshots associated with the user interface of the electronic device obtained in the last 15 s, no deletion operation is performed. In this way, the screenshots final retained are uniform in time (i.e., one screenshot every 0.4 s). According to other examples, of course, it is also possible to retain the odd numbered screenshots and delete the even numbered screenshots.

In this way, without knowing the duration of the automatic screenshot performed on the user interface of the electronic device, the method according to the exemplary embodiment of the present disclosure can not only adaptively adjust the time interval for screenshot according to the duration of the automatic screenshot, but also maintain the time uniformity of the finally obtained screenshots that are associated with the user interface of the electronic device, which can greatly enhance the adaptive ability of the automatic screenshot, and can improve the user's experience.

According to some embodiments, the method may further comprise: recording the user interface of the electronic device to obtain a video associated with the user interface of the electronic device in response to determining that the screenshot start condition is satisfied; and stopping the recording of the user interface of the electronic device in response to determining that the screenshot stop condition is satisfied.

According to some embodiments, recording the user interface of the electronic device (also referred to as screen recording) refers to recording content displayed on the user interface of the electronic device within a period of time as a video, and the obtained video is referred to as a video associated with the user interface of the electronic device.

According to some embodiments, pictures displayed on the user interface may be recorded in frames and synthesized into a video.

Although only some embodiments of screen recording are listed by way of example above, it should be noted that all technologies in the related art capable of implementing user interface (or screen) recording can be used in the present disclosure.

In the present disclosure, the recording of the user interface of the electronic device is realized by the electronic device itself, rather than shooting the user interface of the electronic device by an external device (e.g., a camera, etc.).

In the present disclosure, a recording time refers to a time elapsed from the determination that the screenshot start condition is satisfied to the determination that the screenshot stop condition is satisfied.

According to some embodiments, the recording of the user interface of the electronic device is generally used to record a video being played by the electronic device, or to record demonstration operations on an application, etc. Certainly, the present disclosure is not limited to these embodiments.

According to some embodiments, the entirety of the user interface of the electronic device is recorded. According to other embodiments, a part of the user interface of the electronic device is recorded. For example, a black edge area of a video can be automatically filtered out in the process of recording the video.

Figure 3:
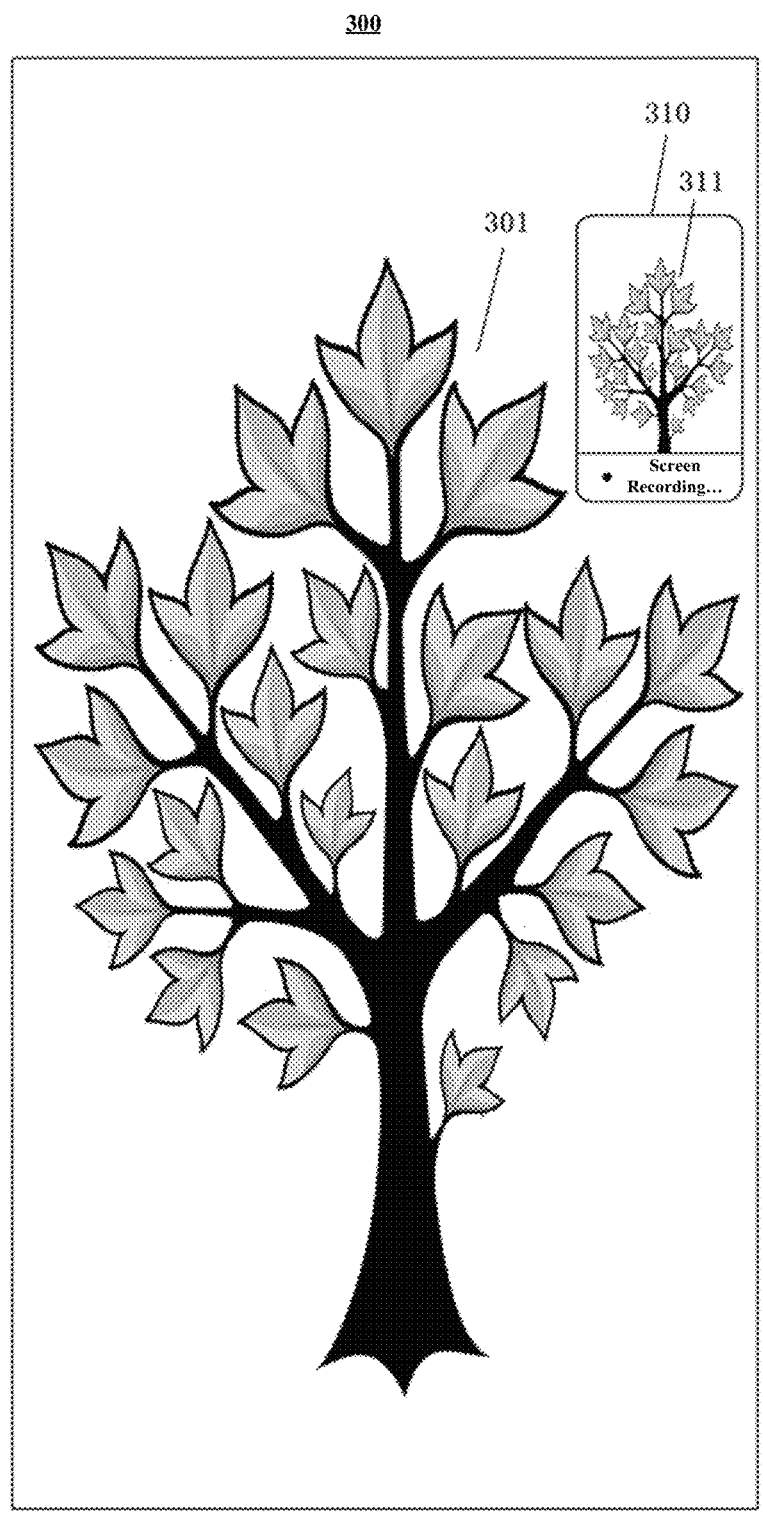
FIG. 3 is a schematic diagram showing a user interface comprising a screen recording window according to an exemplary embodiment of the present disclosure.

FIG. 3 is a schematic diagram showing a user interface comprising a screen recording window according to an exemplary embodiment of the present disclosure. A screen recording window that can be displayed when recording the user interface of the electronic device will be described below in conjunction with FIG. 3.

According to some embodiments, the method further comprises: displaying a screen recording window 310 on the user interface 300 of the electronic device in response to determining that an automatic screenshot indication input satisfies the screenshot start condition, wherein the screen recording window indicates that the user interface of the electronic device is being recorded.

According to some embodiments, a screen recording animation will not be displayed during the recording of the user interface of the electronic device. In particular, when automatic screenshot is performed on the user interface of the electronic device, the electronic device will neither display a screenshot animation nor produce a screenshot sound effect. In this case, after determining that the screenshot start condition is satisfied, although the electronic device is really performing screen recording and automatic screenshot, the user may doubt about whether the electronic device is really performing screen recording and automatic screenshot because any feedback from the electronic device cannot be received. Therefore, according to some embodiments, the user is provided with visual feedback indicating that the user interface of the electronic device is being recorded by displaying the screen recording window 310.

According to some embodiments, a text prompt "Screen recording . . . " is displayed in the screen recording window 310 to provide more intuitive visual feedback to the user. As shown in the example of FIG. 3, the text prompt is located at a bottom of the screen recording window. Certainly, the present disclosure is not limited to this, and the text prompt can also be located at a top or middle of the screen recording window.

According to some embodiments, an elapsed time for the recording of the user interface of the electronic device is displayed in real time on the user interface 300 or the screen recording window 310. According to some embodiments, the elapsed time displayed in real time has a certain transparency, such as 60% or the like. In this way, the user can be reminded of the elapsed time for the recording of the user interface of the electronic device in real time.

In some cases, although the screen recording window is displayed on the user interface, the user may not want the screen recording window to be recorded in the video associated with the user interface of the electronic device, nor does he/she want the screen recording window to be automatically captured into at least one screenshot associated with the user interface of the electronic device.

According to some embodiments, the performing of the automatic screenshot on the user interface of the electronic device comprises: do not performing automatic screenshot of the screen recording window during the automatic screenshot on the user interface of the electronic device; and the recording of the user interface of the electronic device comprises: do not recording the screen recording window during the recording of the user interface of the electronic device.

According to some embodiments, not recording of the screen recording window means that during the recording of the user interface of the electronic device, an area other than the screen recording window and an area obscured by the screen recording window on the user interface of the electronic device can be recorded, so that the screen recording window does not exist in the video.

According to some embodiments, not performing of the automatic screenshot of the screen recording window means that during the automatic screenshot on the user interface of the electronic device, an area other than the screen recording window and an area obscured by the screen recording window on the user interface of the electronic device can be automatically captured, so that the screen recording window does not exist in the plurality of screenshots.

According to some embodiments, the screen recording window displayed on the user interface is automatically filtered out in the process of recording the user interface of the electronic device. The technology of automatically filtering out the screen recording window during the recording process will be described in detail below.

According to some embodiments, the not performing of automatic screenshot of the screen recording window and/or the not recording of the screen recording window comprises: adjusting a capture attribute of the screen recording window to be capture disabled; detecting and receiving the capture attribute of the screen recording window when starting the automatic screenshot on the user interface of the electronic device and/or starting the recording of the user interface of the electronic device; and do not performing automatic screenshot of the screen recording window during the automatic screenshot on the user interface of the electronic device and/or do not recording the screen recording window during the recording of the user interface of the electronic device in response to receiving the capture attribute of the screen recording window that is set to be capture disabled.

According to some embodiments, the user interface of the electronic device and the screen recording window is displayed in different layers. For example, the user interface of the electronic device is displayed in a first layer, and the screen recording window is displayed in a second layer that is displayed above the first layer. According to some embodiments, during display, since the screen recording window is displayed above the user interface, an area obscured by the screen recording window on the user interface will not be displayed.

According to some embodiments, the capture attribute of the screen recording window is adjusted to be capture disabled. For example, a NOT CAPTURE attribute value can be assigned to the screen recording window.

According to some embodiments, the capture attribute of the screen recording window displayed in the second layer is detected. If the capture attribute is capture disabled, the screen recording window displayed in the second layer is automatically filtered out during the recording of the user interface of the electronic device and/or automatic screenshot on the user interface of the electronic device, and only the user interface of the electronic device displayed in the first layer is recorded and/or automatically captured.

In other words, the user interface of the electronic device is recorded in a manner as if the screen recording window does not exist, and the user interface is automatically captured in a manner as if the screen recording window does not exist.

According to some embodiments, the displaying of the screen recording window on the user interface of the electronic device comprises: rendering the user interface of the electronic device on a user interface view control in real time; and disposing the user interface view control in the screen recording window to display a thumbnail of the user interface of the electronic device in real time in the screen recording window.

According to some embodiments, the user interface of the electronic device is rendered in the user interface view control in real time by a virtual display technique. The user interface view control is, for example, a Surface control. The virtual display technique may comprise, for example, VirtualDisplay in the Android system, or the like.

In this way, the content displayed in the screen recording window can be synchronized with the content displayed on the user interface of the electronic device.

As shown in the example of FIG. 3, the content 301 being displayed on the user interface 300 is a tree, and the content 311 displayed in real time in the screen recording window is a thumbnail of the tree to provide visual feedback to the user that the electronic device is indeed recording the user interface currently displayed.

According to some embodiments, an aspect ratio of the screen recording window is the same as an aspect ratio of the user interface of the electronic device. According to some embodiments, the screen recording window have four rounded corners to appear more beautiful.

According to some embodiments, it is possible to record a part of the user interface of the electronic device and automatically capture a part of the user interface of the electronic device. It should be noted that although the following description will be given only with the recording of a part of the user interface of the electronic device as an example, this technique can also be used in screenshot of a part of the user interface of the electronic device.

According to some embodiments, in the case of video playing, a part of the user interface of the electronic device is, for example, a video playback area.

According to some embodiments, the method further comprises: determining whether the user interface of the electronic device is displaying a video playback application window corresponding to a video playback application during the automatic screenshot on the user interface of the electronic device, wherein the video playback application window comprises a video playback area; wherein the performing of the automatic screenshot on the user interface of the electronic device comprises: only performing screenshot of the video playback area in response to determining that the user interface of the electronic device is displaying the video playback application window; and the recording of the user interface of the electronic device comprises: only recording the video playback area in response to determining that the user interface of the electronic device is displaying the video playback application window.

According to some embodiments, it is possible to determine whether an application window being displayed is a video playback application window based on information of the application window being displayed on the current user interface that is read from a system of the electronic device. According to some examples, the video playback application corresponding to the video playback application window is TikTok or Vigo Video.

According to some embodiments, the video playback application window displays a video playback area, an advertisement area, a user comment area, and a director, actor, dubbing staff introduction area, etc. However, when automatically performing screenshot of a video played in the video playback application window and/or recording a video played in the video playback application window, the user may only want to record or automatically capture the video playback area as a part of the user interface of the electronic device.

According to some embodiments, the performing of the automatic screenshot on the user interface of the electronic device and/or the only recording of the video playback area comprise: determining a location of the video playback area on the user interface of the electronic device; and performing screenshot of the video playback area and/or recording the video playback area based on the location of the video playback area on the user interface of the electronic device.

According to some embodiments, the video playback area is represented using coordinates. According to some examples, a coordinate system is established with the vertex at the lower left corner of the user interface as the origin, the horizontal right direction of the user interface as the positive x direction, and the vertical upward direction of the user interface as the positive y direction. According to some embodiments, the determining of the location of the video playback area on the user interface of the electronic device comprises determining coordinates of edges of the video playback area in the coordinate system, and taking all coordinates within an area defined by the edges as the video playback area.

According to some examples, in the case where the video playback area is a rectangular area, linear functions of the four edges of the video playback area in the coordinate system can be determined. For example, the two horizontal edges are y=a and y=b (where a<b), and the two vertical edges are x=c and x=d (where c<d). Then, a region enclosed by the four edges is treated as a video playback area, for example $\{c \leqslant x \leqslant d,\ \text{and}\ a \leqslant y \leqslant b\}$. According to some embodiments, the left edge of the obtained video playback area corresponds to pixels constituting the edge of the playback video area, and the content displayed by these pixels can be recorded, so as to achieve the recording of a part of the user interface of the electronic device. Similarly, it is also possible to only capture the content displayed by these pixels, so as to achieve automatic screenshot of part of the user interface of the electronic device.

In this way, interference from non-video playback areas can be eliminated, facilitating the user to only record and/or capture the video in the video playback area. Thereby, the user's viewing experience can be improved.

If the played video is a movie, the video playback area can be further reduced to determine a movie playing area. For example, the aspect ratio of a rectangular video playback area is usually 1.85:1, while the aspect ratio of a movie screen is usually 2.35:1. Therefore, the movie playing area can be further determined as, for example, $\{c \leqslant x \leqslant d,\ \leqslant a+(b-a)/9.4 \leqslant y\ 且\ b-(b-a)/9.4\}$.

According to some embodiments, the determining of the location of the video playback area on the user interface of the electronic device comprises the following three methods.

In some cases, in the video playback application window, since there is a significant change in gray at the junction of the video playback area and its surrounding area, the video playback area can be determined by edge detection.

According to some embodiments, the determining of the location of the video playback area on the user interface of the electronic device comprises: detecting a frame of the video playback area; and determining an area within the frame as the video playback area based on the frame of the video playback area.

According to some embodiments, the method of detecting the frame of the video playback area comprises: obtaining an image of the current user interface of the electronic device; denoising the obtained image by Gaussian smoothing; convoluting the denoised image by an operator (such as Canny operator, Lapacian operator, etc.) to obtain a gradient value for each pixel of the obtained image; determining pixels whose gradient values are greater than a gradient threshold (e.g., a maxima of the gradient value); and connecting these pixels to obtain the frame of the video playback area.

In some cases, the developer of a video playback application usually develop multiple versions of video playback application windows to adapt to different types of electronic devices.

According to some embodiments, the determining of the location of the video playback area on the user interface of the electronic device comprises: obtaining a resolution of the electronic device; determining a video playback application corresponding to a video playback application window being displayed on the user interface of the electronic device; and determining the location of the video playback area on the user interface of the electronic device based on the obtained resolution of the electronic device and a determined video playback application corresponding to the video playback application window being displayed on the user interface of the electronic device.

According to some embodiments, the resolution of the electronic device comprises a resolution of the user interface of the electronic device, a resolution of the display screen of the electronic device, etc. According to some embodiments, when playing a video, the video playback area depends on the resolution of the user interface and/or the display screen.

Therefore, the video playback area can be accurately obtained by determining the resolution of the user interface and/or the display screen.

According to some embodiments, the determining of the location of the video playback area on the user interface of the electronic device comprises: obtaining a model number of the electronic device; determining a video playback application corresponding to a video playback application window being displayed on the user interface of the electronic device; and determining the location of the video playback area on the user interface of the electronic device based on the obtained model number of the electronic device and the determined video playback application corresponding to the video playback application window being displayed on the user interface of the electronic device.

According to some embodiments, the model number of the electronic device comprises a manufacturer of the electronic device and a model of the electronic device. For example, the manufacturer of the electronic device (mobile phone) is Smartisan, the model is M1, the video playback application program corresponding to the currently displayed video playback application window is TikTok. According to the above information, the video playback area of the TikTok on a Smartisan M1 mobile phone can be accurately acquired.

In some cases, the video playback area can be acquired by directly extracting a video stream from the system of the electronic device.

According to some embodiments, the method may further comprise: obtaining an elapsed time for the recording of the user interface of the electronic device in real time; and determining that the screenshot stop condition in step S103 is satisfied when the elapsed time obtained in real time is equal to a stop threshold time. According to some embodiments, the stop threshold time is preset by a user or set by a system of the electronic device by default. According to some examples, the stop threshold time is 20 seconds, 30 seconds, 1 minute, 2 minutes, etc.

According to some embodiments, the stop threshold time is set to infinity.

According to some embodiments, the stop threshold time is set to a sufficiently large value. In other words, the stop threshold time is set to a value that is almost impossible to reach when the screen recording and screenshot function is normally used. According to some examples, for example, the value of the stop threshold time is set to 0x7fffff. The value 0x7fffffff is actually the maximum value of a 32-bit integer. The value 0x7fffff, in seconds, is about more than 68 years, and thereby the stop threshold time can be approximately considered as being set to infinity.

According to some embodiments, when the plurality of screenshots are stored in memory, the available memory of the electronic device can be determined in real time. According to some embodiments, a reserved memory space may be allocated in the electronic device. The reserved memory space can be a memory space required to ensure the normal operation of the system of the electronic device. According to some examples, if the available memory determined in real time is the reserved memory space, the elapsed time is determined as the stop threshold time.

According to other embodiments, when the plurality of screenshots are stored in the storage area of a cache memory, the remaining space of the cache memory can be determined in real time. According to some embodiments, a reserved space can be allocated in the cache memory of the electronic device. According to some examples, if the remaining space determined in real time is the reserved space, the elapsed time is determined as the stop threshold time.

According to some embodiments, the reserved memory and/or reserved space may vary according to the model number of the electronic device. According to some embodiments, the reserved memory and/or reserved space may also be associated with applications running in the electronic device. However, those skilled in the art should understand that the present disclosure is not limited to this, and the reserved memory and/or reserved space can be determined in any way. Generally, the size of the reserved memory and/or reserved space is not zero. However, in some cases, the size of the reserved memory and/or reserved space may be zero.

In some cases, the user may want to autonomously determine the time to stop automatic screenshot.

According to some embodiments, the method further comprises: receiving a screenshot stop input for the user interface of the electronic device; and determining that the screenshot stop condition is satisfied in response to the screenshot stop input.

In this way, the user can stop automatic screenshot on the user interface of the electronic device through an screenshot stop input (for example, a click input on a button for stopping screen recording, a click input on the screen recording window, a press input on the user interface (for example, the user interface 300), which can further improve the degree of freedom of user operation and improve the user's experience.

According to some embodiments, the method further comprises: displaying thumbnails of the plurality of screenshots and a thumbnail of the video on the user interface of the electronic device after stopping the screenshot on the user interface of the electronic device and stopping the recording of the user interface of the electronic device.

Figure 4A:
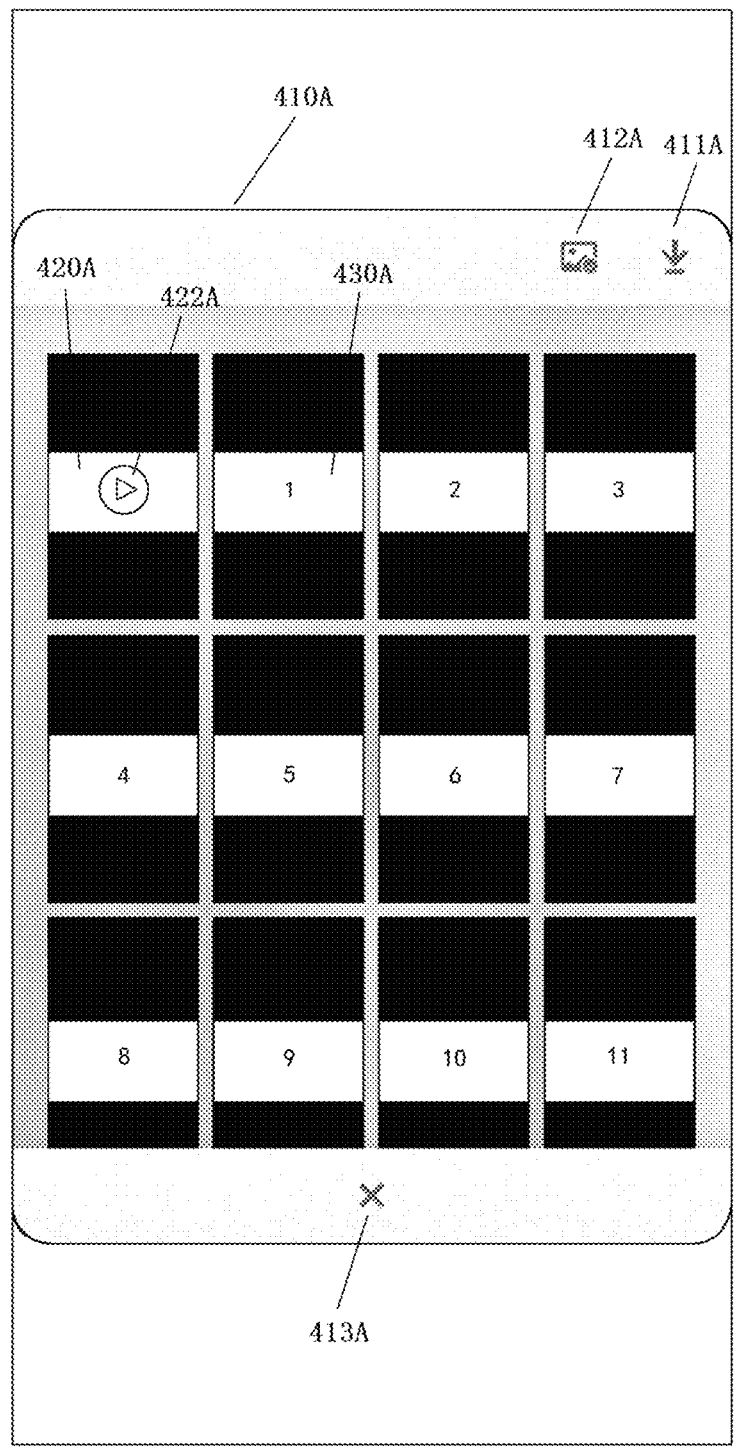
FIG. 4A is a schematic diagram showing a user interface comprising a video and a plurality of screenshots displayed when the electronic device is in a portrait screen state according to an exemplary embodiment of the present disclosure.
Figure 4B:
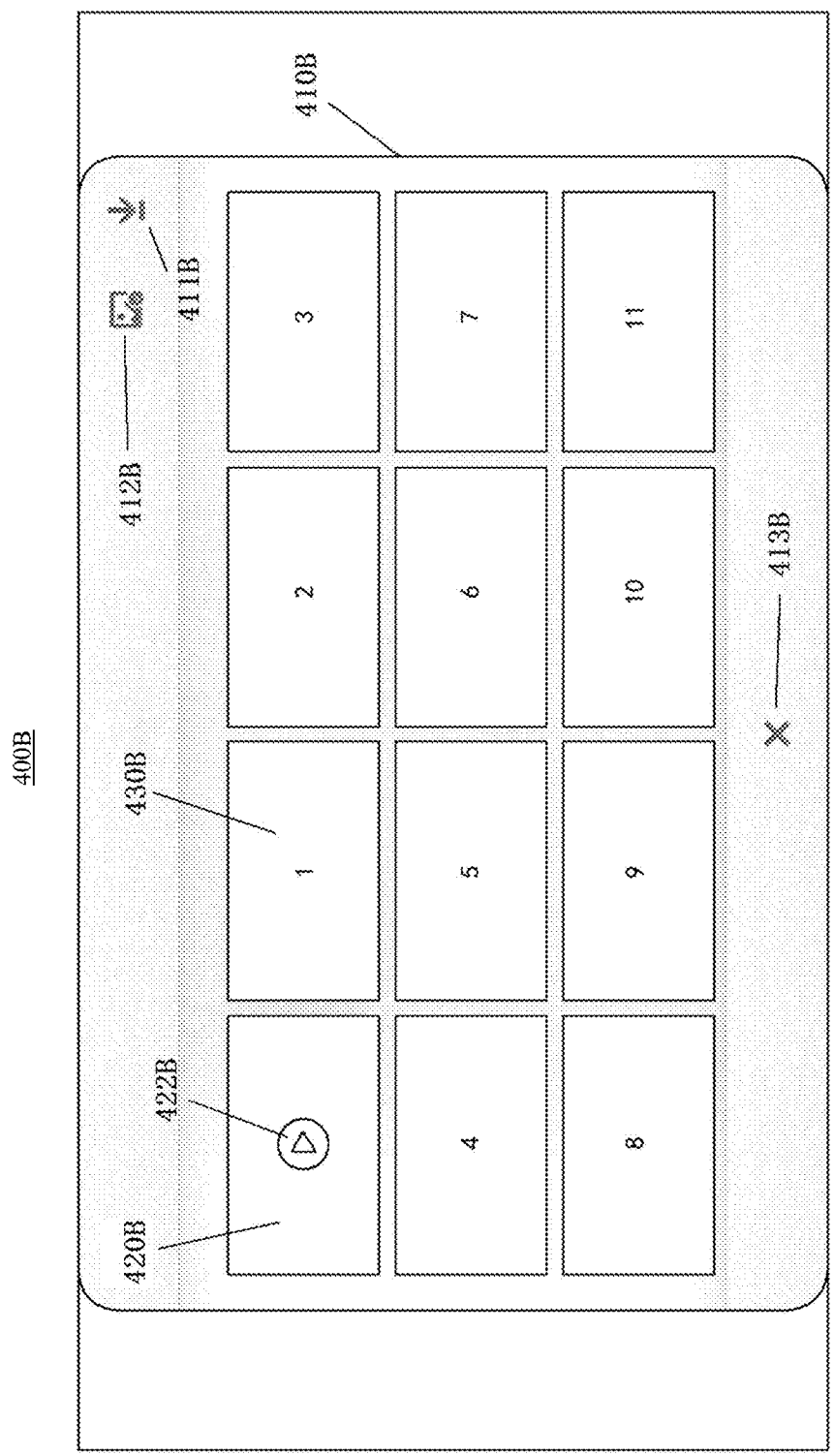
FIG. 4B is a schematic diagram showing a user interface comprising a video and a plurality of screenshots displayed when the electronic device is in a landscape screen state according to an exemplary embodiment of the present disclosure.

How to display a recorded video associated with the user interface of the electronic device and a plurality of screenshots associated with the user interface of the electronic device that are automatically captured will be described in detail below in conjunction with FIGS. 4A and 4B. FIG. 4A is a schematic diagram showing a user interface 400A comprising a video and a plurality of screenshots displayed when the electronic device is in a portrait screen state according to an exemplary embodiment of the present disclosure. FIG. 4B is a schematic diagram showing a user interface 400B comprising a video and a plurality of screenshots displayed when the electronic device is in a landscape screen state according to an exemplary embodiment of the present disclosure.

According to some embodiments, a thumbnail of the video and thumbnails of the plurality of screenshots can be displayed directly on the user interface of the electronic device after the recording of the user interface of the electronic device is stopped and the screenshot on the user interface of the electronic device is stopped.

According to other embodiments, as shown in FIGS. 4A and 4B, after the recording of the user interface of the electronic device is stopped and the screenshot on the user interface of the electronic device is stopped, video and screenshot cards 410A and 410B can be displayed on the user interfaces 400A and 400B of the electronic device, and thumbnails 420*a* and 420B of the video and thumbnails 430A and 430B of the plurality of screenshots can be displayed on the video and screenshot cards 410A and 410B.

In the present disclosure, whether the user interface, the thumbnail of the video and the thumbnails of the plurality of screenshots are displayed in a portrait screen orientation or a landscape screen orientation is defined by the comparison result of the aspect ratio with 1.

In particular, in the present disclosure, if the aspect ratio of the user interface is less than 1, the display orientation of the user interface is the portrait screen orientation. If the aspect ratio of the user interface is greater than 1, the display orientation of the user interface is the landscape screen orientation.

In particular, in the present disclosure, if the aspect ratio of the thumbnail of the video and the thumbnails of the plurality of screenshots is less than 1, the display orientation of the thumbnail of the video and the thumbnails of the plurality of screenshots is the portrait screen orientation. If the aspect ratio of the thumbnail of the video and the thumbnails of the plurality of screenshots is greater than 1, the display orientation of the thumbnail of the video and the thumbnails of the plurality of screenshots is the landscape screen orientation.

In some cases, during the recording of the user interface of the electronic device and the automatic screenshot on the user interface of the electronic device, the user may rotate the electronic device (for example, the electronic device may be rotated from the portrait screen orientation to the landscape screen orientation, or from the landscape screen orientation to the portrait screen orientation). In these cases, the thumbnail of the video and the thumbnails of the plurality of screenshots may be neither in the portrait screen orientation nor in the landscape screen orientation, but in an inclined orientation with a certain angle.

According to some embodiments, in response to the screenshot stop condition, thumbnails of those of the screenshots that are in the portrait screen orientation or landscape screen orientation are retained and displayed, and thumbnails of the screenshots that are neither in the portrait screen orientation nor in the landscape screen orientation are deleted.

In this way, the uniformity of the retained and displayed screenshots can be guaranteed, resulting in good visual experience.

In addition, in some of the above cases, since the orientation of the electronic device may change during the recording of the user interface of the electronic device and automatic screenshot on the user interface of the electronic device, the orientations of the screenshots may be inconsistent with each other.

According to some embodiments, the display orientation of the thumbnail of the video and the thumbnails of the plurality of screenshots can be determined based on the orientation of the electronic device at the time of stopping screen recording.

According to some embodiments, the method further comprises: determining a screenshot stop orientation, wherein the screenshot stop orientation is an orientation of the electronic device at the time when the screenshot on the user interface of the electronic device is stopped and the recording of the user interface of the electronic device is stopped; and displaying the thumbnails of the plurality of screenshots and the thumbnail of the video on the user interface of the electronic device based on the screenshot stop orientation.

According to some embodiments, the screenshot stop orientation comprises the portrait screen orientation and the landscape screen orientation as defined above.

According to some embodiments, the display orientation of the thumbnail of the video and the thumbnails of the plurality of screenshots is the same as the screenshot stop orientation. According to some examples, in a case where the screenshot stop orientation is determined as the portrait screen orientation, the display orientation of the thumbnail of the video and the thumbnails of the plurality of screenshots is also the portrait screen orientation. According to some examples, in a case where the screenshot stop orientation is determined as the landscape screen orientation, the display orientation of the thumbnail of the video and the thumbnails of the plurality of screenshots is also the landscape screen orientation.

For example, the screenshot stop orientation is the landscape screen orientation. As shown in FIG. 4A, although the orientation of the electronic device is the portrait screen orientation and the display orientation of the user interface 400A is also the portrait screen orientation, since the screenshot stop orientation is the landscape screen orientation, the display orientation of the thumbnail 420A of the video and the thumbnails 430A of the plurality of screenshots is the landscape screen orientation. Referring to FIG. 4A, since the display orientation (landscape screen orientation) of the thumbnail 420A of the video and the thumbnails 430A of the plurality of screenshots is inconsistent with the display orientation (portrait screen orientation) of the user interface 400A, there are black edge areas displayed above and below these thumbnails. As shown in FIG. 4B, the real-time orientation of the electronic device is the landscape screen orientation, and the display orientation of the user interface 400A is the landscape screen orientation. Since the screenshot stop orientation is the landscape screen orientation, the display orientation of the thumbnail 420A of the video and the thumbnails 430A of the plurality of screenshots is the landscape screen orientation. Referring to FIG. 4B, since the display orientation (landscape screen orientation) of the thumbnail 420B of the video and the thumbnails 430B of the plurality of screenshots is consistent with the display orientation (landscape screen orientation) of the user interface 400B, there are no black edge areas displayed above and below these thumbnails.

In this way, although the electronic device is rotated during the recording of the user interface of the electronic device and the automatic screenshot on the user interface of the electronic device (for example, the electronic device is rotated from the portrait screen orientation to the landscape screen orientation, or from the landscape screen orientation to the portrait screen orientation), it can be ensured that the thumbnail of the video and the thumbnails of the plurality of screenshots have consistent display orientations, such that the consistency in visual sense can be guaranteed, and a neat appearance of the user interface may be achieved.

According to some embodiments, the method further comprises: receiving a display input for a thumbnail of a first screenshot of the plurality of screenshots; displaying the first screenshot on the user interface of the electronic device in full screen in response to the display input; receiving a playback input for the thumbnail of the video; and playing the video on the user interface of the electronic device in full screen in response to the playback input.

According to some embodiments, the playback input for the thumbnail of the video comprises: a click input on a playback button 422A or 422B (refer to FIGS. 4A and 4B) on the thumbnail of the video, a press input on the thumbnail of the video, etc. According to some embodiments, the display input for a thumbnail of a first screenshot of the plurality of screenshots comprises: a click input on an increase size button on the thumbnail of the first screenshot, a press input on the thumbnail of the first screenshot, etc.

According to some embodiments, the video played in full screen is the original video obtained by recording, and its resolution is greater than the resolution of the thumbnail of the video. The first screenshot displayed in full screen is the original picture obtained by automatic screenshot, and its resolution is greater than the thumbnail of the first screenshot.

According to some embodiments, black edge areas present in the plurality of screenshots are removed before displaying a plurality of thumbnails associated with the plurality of screenshots associated with the user interface of the electronic device. In this way, in operations such as saving and sharing described below, pictures with black edge areas removed can be saved and shared.

According to some embodiments, since there is a significant change in gray at the junction of a black edge area and other areas than the black edge area in the screenshot, the black edge area can also be determined by edge detection, and the black edge area detected in the screenshot can be removed.

According to some examples, each of the plurality of screenshots is denoised by Gaussian smoothing; the denoised image is by convoluted with an operator (such as Canny operator, Lapacian operator, etc.) to obtain a gradient value for each pixel of each screenshot; pixels whose gradient values are greater than a gradient threshold (e.g., a maxima of the gradient value) are determined; the pixels are connected to determine a black edge area in each screenshot (if there is a black edge area); and the black edge area is removed from the screenshot with the black edge area.

In this way, if a black edge area is not removed during the automatic screenshot on the user interface of the electronic device, the black edge area can still be removed from the plurality of screenshots associated with the user interface of the electronic device, which can reduce the memory occupation of the electronic device during the process of automatic screenshot.

According to other embodiments, it is of course also possible to remove a black edge area not only during the automatic screenshot on the user interface of the electronic device, but also to remove a block edge area from the obtained screenshots associated with the user interface of the electronic device.

According to some embodiments, the method further comprises: receiving a first save input for a first save button 411A or 411B displayed on the user interface of the electronic device; and storing the plurality of screenshots in a screenshot folder and storing the video in a video folder in response to the first save input.

According to some embodiments, the first save input is a click input, a press input, or the like on the first save button displayed on the user interface of the electronic device.

In this way, the video and the plurality of screenshots can be saved simultaneously by the first save input. Compared with the related art, the user does not need to store the video and the screenshots separately, which can simplify the user's operation.

According to some embodiments, the method further comprises: receiving a first share input for a first share button and a first application option displayed on the user interface of the electronic device, wherein the first application option corresponds to a first application; and sharing the plurality of screenshots and the video to the first application in response to the first share input.

According to some embodiments, the first application option can be displayed directly on the user interface of the electronic device. The first share input may be a click input on the first share button and a click input on the first application option.

According to other embodiments, the first application option can not be displayed directly on the user interface of the electronic device, and the first share input comprises a first input and a second input. The first input of the first share input comprises a click input, a press input, a slide input, etc. on the first share button. A list of share target applications is displayed on the user interface in response to the first input of the first share input, the list of share target applications comprising the first application option. The second input of the first share input comprises a click input, a press input, a slide input, etc. on the first application option. The video and the at least one screenshot are shared to the first application corresponding to the first application option in response to the second input of the first share input.

In this way, it is not necessary to display the first application option on the user interface of the electronic device before receiving the first input of the first share input, especially in the case that there are many application options, which makes the user interface more concise. In addition, dividing the first share input into the first input and the second input may provide more opportunities for the user to consider when deciding which application to share the video and multiple screenshots to.

Figure 5:
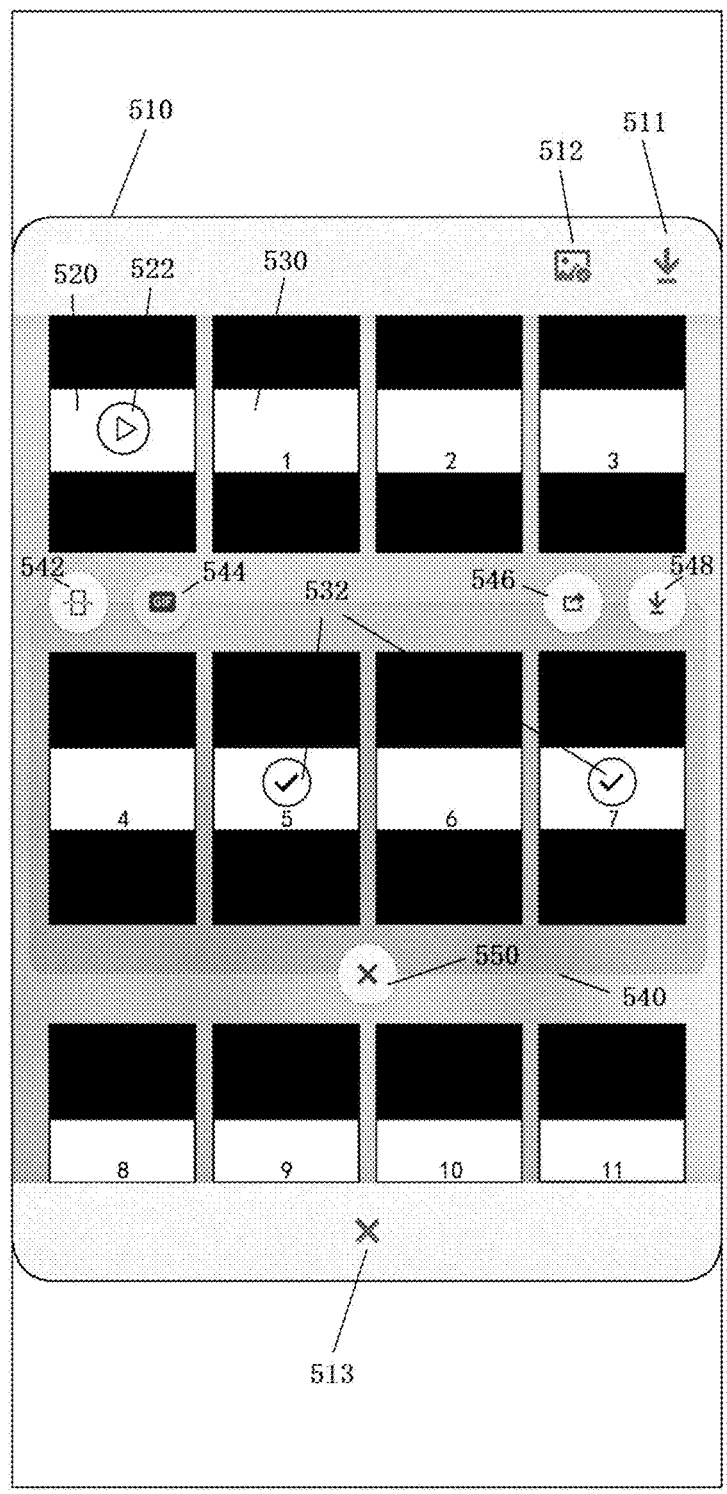
FIG. 5 is a schematic diagram showing a user interface for editing a video and a plurality of screenshots displayed according to an exemplary embodiment of the present disclosure.

Edition operations on a video and a plurality of screenshots will be described below in conjunction with FIG. 5. FIG. 5 is a schematic diagram showing a user interface 500 for editing a displayed video and a plurality of screenshots according to an exemplary embodiment of the present disclosure.

According to some embodiments, the method further comprises: receiving a selection input for one or more thumbnails among the thumbnail of the video and the thumbnails of the plurality of screenshots; selecting the one or more thumbnails in response to the selection input; and deselecting the one or more thumbnails again in response to the selection input.

According to some embodiments, the selection input for the thumbnail of the video comprises a click input, a press input, etc. on the thumbnail of the video. According to some embodiments, the selection input for one or more thumbnails of the plurality of screenshots comprises a click input, a press input, a slide input, etc. on the one or more thumbnails. For example, in a case where the selection input is a slide input, the selecting of the one or more thumbnails in response to the selection input may comprise: determining a slide path of the slide input on the user interface, determining thumbnails that the slide path passes through, and taking the thumbnails that the slide path passes through as the one or more selected thumbnails.

In this way, the user can select thumbnails corresponding to the screenshots in various ways according to his/her preference and the number of screenshots to be selected, so that the user can be provided with a greater degree of freedom, and the user's experience can be improved.

According to some embodiments, one or more selected thumbnails can be highlighted in response to the selection input. According to some examples, a check mark is displayed on the one or more selected thumbnails. For example, as shown in FIG. 5, in a case where the thumbnail of screenshot 5 and the thumbnail of screenshot 7 are selected, tick symbols are displayed on the thumbnail of screenshot 5 and the thumbnail of screenshot 7 as check marks 532. According to some examples, a bold border can be displayed around the one or more selected thumbnails. According to some examples, the size of the one or more selected thumbnails can be slightly increased. According to some examples, the brightness of the one or more selected thumbnails can be increased.

According to some embodiments, the one or more selected thumbnails may no longer be highlighted again in response to the selection input. According to some examples, the check marks may no longer be displayed. For example, the tick symbols as the check marks 532 are no longer displayed. According to some examples, the bold border around the one or more selected thumbnail may no longer be displayed. According to some examples, the one or more thumbnails displayed in a slightly increased size may be reduced to its original size. According to some examples, the brightness of the one or more thumbnails whose brightness is increased may be reduced to its original brightness.

In this way, the user can get more clear feedback on which screenshots have been selected and which screenshots have been deselected by the user.

According to some embodiments, the method further comprises: receiving a second save input for a second save button displayed on the user interface of the electronic device when the one or more thumbnails are selected; and storing a screenshot and/or a video that correspond to one or more selected thumbnails among the plurality of screenshots and/or the video in a screenshot folder and/or a video folder in response to the second save input.

According to some embodiments, a second save button is displayed when the thumbnail of the video and the thumbnails of the plurality of screenshots are displayed. According to some examples, the second save button cannot receive the second save input when the thumbnail of the video and the thumbnails of the plurality of screenshots are displayed. According to other examples, the second save button cannot receive the second save input when the thumbnail of the video and the thumbnails of the plurality of screenshots are displayed, and the second save button is configured to receive the second save input when one or more thumbnails are selected. For example, when the second save button is in a state in which the second save input can be received, it can be displayed normally; when the second save button is in a state in which the second save input cannot be received, it is grayed out.

According to some embodiments and referring to FIG. 5, a second save button 548 is displayed when one or more thumbnails are selected. According to some examples as shown in FIG. 5, when one or more thumbnails are selected, an edit frame 540 is displayed on the video and screenshot card 510. An upper edge of the edit frame 540 may be located above a top row of the one or more selected thumbnails, and a lower edge of the edit frame 540 may be located below a bottom row of the one or more selected thumbnails. In this way, the spatial extent of the one or more selected thumbnails can be shown in a better manner. According to some examples, the second save button 548 is displayed on the upper edge of the edit frame 540. Of course, the present disclosure is not limited to this.

According to some embodiments, the second save input on the second save button displayed on the user interface of the electronic device comprises a click input, a press input, etc. on the second save button.

In this way, with the second save input, the user can select his favorite video and/or screenshots from the thumbnail of the video and the thumbnails of the plurality of screenshots, and save these video and/or screenshots to a video folder and/or a screenshot folder respectively.

According to some embodiments, the method further comprises: receiving a second share input for a second share button 546 and a second application option displayed on the user interface of the electronic device when the one or more thumbnails are selected, wherein the second application option corresponds to a second application; and sharing a screenshot and/or a video that correspond to one or more selected thumbnails among the plurality of screenshots and/or the video to the second application in response to the second share input.

According to some embodiments, various occasions for displaying the second share button (e.g., when displaying the thumbnail of the video and the thumbnails of the plurality of screenshots, when selecting one or more thumbnails, etc.), the display location of the second share button (e.g., displayed on the user interface, on the video and screenshot card, on the edit frame, etc.) and the way of displaying the second share button (e.g., normally displayed in a state in which a second share input can be received, grayed out in a state in which a second share input cannot be received) may be the same or similar to that of the second save button described in detail above, and will not be repeated herein.

According to some embodiments, the second share input on the second share button and the second application option displayed on the user interface of the electronic device comprises a click input, a press input, etc. on the second share button.

According to some embodiments, the various way of inputting the second share input (for example, directly displaying a second application option, or displaying a list of target applications comprising the second application option in response to a first input of the second share input, and sharing screenshots corresponding to the one or more selected thumbnails to the second application corresponding to the second application option in response to a second input of the second share input) is the same or similar to the first share input described in detail above, and will not be repeated herein.

In this way, with the second share input, the user can select his favorite video and/or screenshots from the thumbnail of the video and the thumbnails of the plurality of screenshots, and share these video and/or screenshots together to the second application.

According to some embodiments, the method further comprises: receiving a puzzle input 542 for a puzzle button displayed on the user interface of the electronic device when the one or more thumbnails are selected; and generating a mosaic image for one or more screenshots of the plurality of screenshots corresponding to one or more selected thumbnails in response to the puzzle input, wherein the mosaic image spatially comprises one or more screenshots corresponding to the one or more selected thumbnails.

According to some embodiments, various occasions for displaying the puzzle button (e.g., when displaying the thumbnail of the video and the thumbnails of the plurality of screenshots, when selecting one or more thumbnails, etc.), the display location of the puzzle button (e.g., displayed on the user interface, on the video and screenshot card, on the edit frame, etc.) and the way of displaying the puzzle button (e.g., normally displayed in a state in which a puzzle input can be received, grayed out in a state in which a puzzle input cannot be received) may be the same or similar to that of the second save button described in detail above, and will not be repeated herein.

According to some embodiments, when one or more thumbnails are selected, it is determined whether the one or more selected thumbnails comprise a thumbnail of a video. According to some examples, if the one or more selected thumbnails comprise the thumbnail of the video, the puzzle button cannot receive the puzzle input. According to other examples, the puzzle button can receive the puzzle input regardless of whether the one or more selected thumbnails comprise the thumbnail of the video, and in response to the puzzle input, the thumbnail of the selected video is ignored and only a mosaic image of one or more screenshots corresponding to the one or more selected thumbnails is generated.

According to some embodiments, the puzzle input on the puzzle button displayed on the user interface of the electronic device comprises a click input, a press input, etc. on the puzzle button.

According to some embodiments, the mosaic image is an image that spatially comprises one or more screenshots corresponding to all the one or more selected thumbnails. The one or more screenshots can be arranged in the mosaic image in any way.

According to some embodiments, the generating of the mosaic image for one or more screenshots of the plurality of screenshots corresponding to the one or more selected thumbnails comprises: determining a number of selected thumbnails; taking one screenshot corresponding to one selected thumbnail as the mosaic image if the number is equal to one; generating the mosaic image by arranging one screenshot of a plurality of screenshots corresponding to a selected plurality of thumbnails in any one row of the mosaic image, and arranging two screenshots of the plurality of screenshots corresponding to the selected plurality of thumbnails in each of remaining rows of the mosaic image if the number is an odd number greater than one; and generating the mosaic image by arranging two screenshots of the plurality of screenshots corresponding to the selected plurality of thumbnails in each row of the mosaic image if the number is an even number. According to some examples, if the number of selected thumbnails is an odd number greater than 1, one screenshot is arranged in the first row of the mosaic image, and two screenshots are arranged in per row for the remaining rows. For example, when the number of the selected thumbnails is three, these three screenshots can be arranged in a shape of a trefoil. Of course, the present disclosure is not limited to this. According to other examples, the screenshots corresponding to the selected plurality of thumbnails can also be arranged into various shapes such as a circular shape, a heart shape, etc.

For example, when the user records demonstration operation of an application software, screenshots representing several key steps in the demonstration operation can be selected, and these screenshots can be jointed into a mosaic image. Through this mosaic image, the user can be showed with essence content of their teaching demonstration operation without watching the whole video recorded.

According to some embodiments, the method further comprises: receiving an active image input for an active image button displayed on the user interface of the electronic device when the one or more thumbnails are selected; and generating an active image for displaying one or more screenshots corresponding to one or more selected thumbnails at a certain frequency in response to the active image input, wherein the active image temporally comprises the one or more screenshots corresponding to the one or more selected thumbnails.

According to some embodiments, various occasions for displaying the active image button (e.g., when displaying the thumbnail of the video and the thumbnails of the plurality of screenshots, when selecting one or more thumbnails, etc.), the display location of the active image button (e.g., displayed on the user interface, on the video and screenshot card, on the edit frame, etc.) and the way of displaying the active image button (e.g., normally displayed in a state in which an active image input can be received, grayed out in a state in which an active image input cannot be received) may be the same or similar to that of the second save button described in detail above, and will not be repeated herein.

According to some embodiments, when one or more thumbnails are selected, it is determined whether the one or more selected thumbnails comprise a thumbnail of a video. According to some examples, if the one or more selected thumbnails comprise a thumbnail of a video, the active image button cannot receive the active image input. According to other examples, the active image button can receive the active image input regardless of whether the one or more selected thumbnails comprise a thumbnail of a video, and in response to the active image input, the selected thumbnail of the video is ignored and only an active image of one or more screenshots corresponding to the one or more selected thumbnails is generated.

According to some embodiments, the active image input on the active image button displayed on the user interface of the electronic device comprises a click input, a press input, etc. on the active image button.

According to some embodiments, an active image is generated by continuously displaying the one or more of screenshots corresponding to all the one or more selected thumbnails at a certain frame rate. The active image is an image, which can be in the GIF format, and comprises one or more screenshots corresponding to all the one or more selected thumbnails in time.

For example, when the user is recording a movie, a plurality of screenshots representing key scenes and key plots in the movie can be selected, and these screenshots can be used to generate an active image. By means of this active image having playing time much shorter than that of the movie, the user be shown with key scenes and key plots in the movie without watching the whole recorded movie.

In some cases, the recording time may be relatively long and the number of screenshots obtained may be relatively large. In this situation, one or more screenshots can be automatically recommended for the user based on certain criteria.

According to some embodiments, the method further comprises: evaluating the plurality of screenshots based on a preset rule to obtain a score associated with each screenshot of the plurality of screenshots; comparing the score associated with the each screenshot to a score threshold; and highlighting one or more screenshots with scores greater than or equal to the score threshold in the plurality of screenshots on the user interface of the electronic device.

According to some embodiments, the score threshold is fixed. For example, the score threshold is preset by the user or is set by a system by default.

According to other embodiments, the score threshold is variable. According to some examples, the score threshold is set in proportion to a maximum value of the score associated with each screenshot according to a proportion less than 1, such as 90%, 95%, 97%, etc. For another example, the scores associated with the various screenshots are sorted, and a score with the Nth highest score is taken as the score threshold, and N is, for example, 1, 2, 3, 5, etc.

According to some embodiments, one or more screenshots with scores greater than or equal to the score threshold can be highlighted in various ways. For example, a star mark is displayed on one or more thumbnails of one or more screenshots with scores greater than or equal to the score threshold. As another example, one or more thumbnails of one or more screenshots with scores greater than or equal to the score threshold are flickered.

According to some embodiments, the preset rule comprises at least one of the following items: whether there is a human face in a screenshot, completeness of the human face in the screenshot, a resolution of the screenshot, or a sharpness of the screenshot.

According to some embodiments, the score of a screenshot with a face in the screenshots is greater than the score of a screenshot without a face in the screenshots. The score of a screenshot with a higher degree of facial completeness in the screenshots is greater than the score of a screenshot with a lower degree of facial completeness in the screenshots. The score of a screenshot with a high resolution is greater than the score of a screenshot with a low resolution. The score of a screenshot with a high sharpness is higher than the score of a screenshot with a low sharpness.

According to some embodiments, each item in the preset rules can be assigned an associated specific weight, and the item score of each item is multiplied by the associated specific weight and summed to obtain the score of the screenshot.

Other buttons on the user interfaces 400A, 400B, and 500 and their corresponding functions will be described below with reference with FIGS. 4A, 4B and 5. According to some embodiments, in response to an input (e.g., a click input, a press input, etc) on a select all button 412A, 412B, 512, all the thumbnails of the plurality of screenshots can be selected. Further, again in response to the input (e. g., a click input, a press input, etc.) on the select all button 412a, 412b, 512, all the thumbnail of the video and the thumbnails of the plurality of screenshots can be deselected. According to some embodiments, one or more thumbnails are deselected in response to an input (e. g., a click input, a press input, etc.) on a deselect button 550 shown in FIG. 5. According to some embodiments, in response to an input (e.g., a click input, a press input, etc.) on close buttons 413A, 413B, 513 as shown in FIGS. 4A, 4B and 5, the screen recording and screenshot function can be closed.

According to some embodiments, audio information associated with the user interface of the electronic device is synchronously recorded during the recording of the user interface of the electronic device.

According to some embodiments, the method further comprises: collecting audio information associated with the electronic device during the recording of the user interface of the electronic device in response to an audio recording start condition being satisfied, wherein the audio information corresponds to the video in a timeline.

According to some embodiments, the audio information associated with the electronic device comprises audio information outputted externally by an audio output device of the electronic device. According to some embodiments, the audio information associated with the electronic device comprises audio information obtained through an audio input device (e.g., a microphone). According to some embodiments, the audio information associated with the electronic device further comprises audio information obtained directly from underlying hardware of the electronic device. According to some embodiments, the audio information associated with the electronic device further comprises a combination of two or more of the above various audio information associated with the electronic device.

According to some embodiments, the audio information is extracted from the obtained video associated with the user interface of the electronic device after stopping the recording of the user interface of the electronic device.

According to some embodiments, the method further comprises: recognizing and obtaining text information corresponding to the audio information in a timeline in real time; and adding the text information to the video and/or the plurality of screenshots according to the timeline, so that the text information can be displayed simultaneously with the video and/or the plurality of screenshots.

According to some embodiments, the method based on the timeline can make the audio information and the video can be in one-to-one correspondence at the same time. For example, the current user interface is displaying a movie, and audio information can be obtained while recording the screen. In this way, when playing, the video and audio information can be combined according to a timeline, so that the user can not only watch pictures of the movie displayed on the user interface, but also hear sounds corresponding to the displayed movie.

According to some embodiments, text information corresponding to the video and audio information in the timeline can be recognized in real time. For example, the current user interface is displaying a movie, audio information can be obtained while recording the screen, and recognition can be carried out in real time to obtain text information. In this way, when playing, the video and text information can be combined according to a timeline. Therefore, when it is inconvenient to make sound, or if the user is a hearing-impaired person, he/she can view not only pictures of the movie displayed on the user interface, but also real-time subtitles corresponding to the movie.

According to some embodiments, the method based on the timeline can make the audio information, the text information and the video can be in one-to-one correspondence at the same time. For example, the current user interface is displaying a movie, audio information can be obtained while recording the screen, and recognition can be carried out in real time to obtain text information. In this way, when playing, the video, audio and text information can be combined according to the timeline, so that the user can watch pictures of the movie displayed on the user interface, while hearing sounds corresponding to the pictures and viewing real-time subtitles corresponding to the sounds.

It should be noted that although the above description has been given with a movie as an example, the present disclosure is not limited to this. In the process of recording any pictures on the screen, audio information can be obtained simultaneously, and text information corresponding to the audio information can be recognized in real time.

According to some embodiments, a thumbnail corresponding to the audio information is displayed in the video and screenshot card as described above. According to some embodiments, the audio information is played in response to a playback input on the thumbnail of the audio information (e.g., a click input on a playback button displayed on the thumbnail of the audio information, a press input on the thumbnail of the audio information, etc.). According to some embodiments, in response to the first save input described above, in addition to saving the video to a video folder and the plurality of screenshots to a screenshot folder, the audio information can be saved to an audio folder. According to some embodiments, in response to the first share input described above, in addition to sharing the video and the plurality of screenshots to the first application, the audio information can also be shared to the first application.

An exemplary method for operating an electronic device according to the present disclosure has been described above in conjunction with the accompanying drawings. An exemplary device for operating an electronic device and an exemplary embodiment of an electronic device of the present disclosure will be further described below in conjunction with the accompanying drawings.

Figure 6:
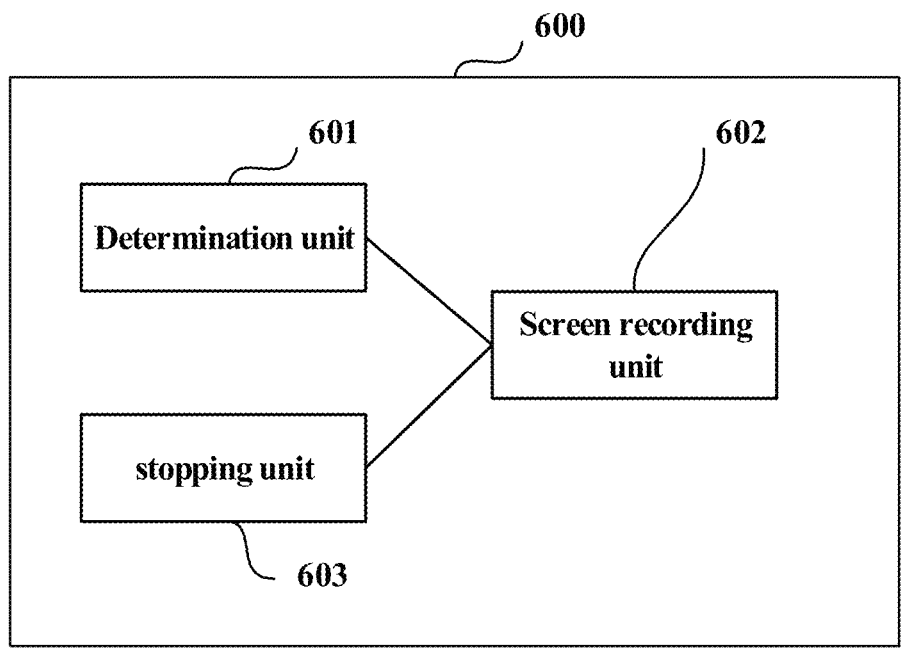
FIG. 6 is a block diagram showing a structure of a device for operating an electronic device according to an exemplary embodiment of the present disclosure.

A second aspect of the present disclosure comprises an device for operating an electronic device. FIG. 6 is a block diagram showing a structure of an apparatus for operating an electronic device according to an exemplary embodiment of the present disclosure. As shown in FIG. 6, the device 600 for operating an electronic device comprises: a determination unit 601 configured to determine whether a screenshot start condition is satisfied; a screenshot unit 602 configured to perform automatic screenshot on a user interface of the electronic device to obtain a plurality of screenshots associated with the user interface of the electronic device; and a stopping unit 603 configured to stop the automatic screenshot on the user interface of the electronic device in response to determining that a screenshot stop condition is satisfied.

According to some embodiments, the apparatus 600 for operating an electronic device further comprises units configured to perform other steps of any of the foregoing methods.

An exemplary device for operating an electronic device of the present disclosure has been briefly described above. It should be noted that, for the specific implementation of the units or features of the exemplary device for operating an electronic device of the present disclosure can refer to the specific implementation of the corresponding features in the foregoing exemplary method for operating an electronic device of the present disclosure, which will not be described in detail herein. In addition, units involved in the description of the exemplary device for operating an electronic device of the present disclosure may be implemented by software or by hardware. The names of the units do not constitute a limitation on the units themselves under certain circumstances.

In addition, the functions of the various units of the exemplary device for operating an electronic device of the present disclosure may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

A third aspect of the present disclosure comprises an electronic device comprising: a processor; and a memory storing a program, the program comprising instructions that, when executed by the processor, cause the processor to perform any of the foregoing methods.

A fourth aspect of the present disclosure comprises a storage medium for storing a program, the program comprising instructions that, when executed by a processor of an electronic device, cause the electronic device to perform any of the foregoing methods.

A fifth aspect of the present disclosure comprises a computer program product comprising a program, the program comprising codes that, when executed by a processor of an electronic device, cause the electronic device to perform any of the foregoing methods.

Figure 7:
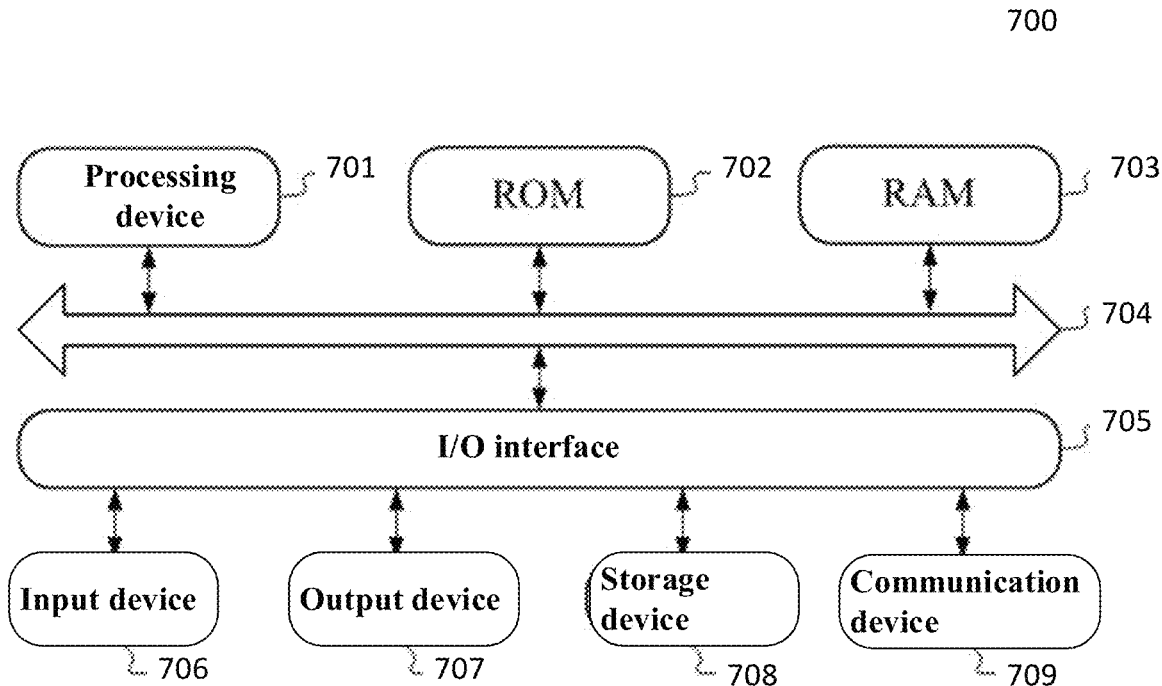
FIG. 7 is a block diagram showing a structure of an electronic device that can be applied to an exemplary embodiment of the present disclosure.

Referring now to FIG. 7, a structural diagram of an electronic device 700 (e.g., the electronic device of the present disclosure) suitable for implementing an embodiment of the present disclosure is shown. The electronic device shown in FIG. 7 is merely an example and should not impose any limitation on the function and scope of the embodiment of the present disclosure.

As shown in FIG. 7, the electronic device 700 may comprise a processing device (e.g., a central processing unit, a graphics processor) 701, which may perform various appropriate actions and processes according to a program stored in Read Only Memory (ROM) 702 or a program loaded from storage device 706 into Random Access Memory (RAM) 703. In RAM 703, various programs and data required for the operation of the electronic device 700 are also stored. Processing device 701, ROM 702 and RAM 703 are connected to each other through bus 704. Input/Output (I/O) interface 705 is also connected to bus 704.

Generally, the following devices can be connected to I/O interface 705: input devices 706 comprising, for example, a touch screen, a touch pad, a keyboard, a mouse, a camera, a microphone, an accelerometer, a gyroscope, etc; output devices 707 comprising a liquid crystal display (LCD), a speaker, a vibrator, etc.; storage devices 706 comprising, for example, a magnetic tape, a hard disk, etc.; and a communication device 709. The communication device 709 enables the electronic device 700 to communicate wirelessly or by wire with other devices to exchange data. Although FIG. 7 shows the electronic device 700 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 709, or installed from the storage device 706, or from the ROM 702. When the computer program is executed by the processing device 701, the above functions defined in the method of the embodiment of the present disclosure are performed.

It should be noted that the above storage medium of the present disclosure can be a computer-readable storage medium. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, examples of communication networks comprise a Local Area Network ("LAN"), a Wide Area Network ("WAN"), an Internet (e.g., the Internet), and an peer-to-peer network (e. g., an ad hoc peer-to-peer network), as well as any currently known or future developed network.

The above computer-readable medium may be comprised in the electronic device described above; or it may exist alone without being assembled into the electronic device.

The computer-readable medium carries one or more programs that cause, when executed by the electronic device, the electronic device to determine whether a screenshot start condition is satisfied; record the user interface of the electronic device to obtain a video associated with the user interface of the electronic device in response to determining that the screenshot start condition is satisfied; perform automatic screenshot on the user interface of the electronic device to obtain a plurality of screenshots associated with the user interface of the electronic device during the recording of the user interface of the electronic device; and stop the recording of the user interface of the electronic device and the performing of the screenshot on the user interface of the electronic device in response to determining that a screenshot stop condition is satisfied.

The computer program code for executing operations of the present disclosure may be complied by any combination of one or more program design languages, the program design languages comprising but not limited to object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case of a remote computer, the remote computer may be connected to the user computer through various kinds of networks, comprising local area network (LAN) or wide area network (WAN), or connected to external computer (for example using an internet service provider via Internet).

The flowcharts and block diagrams in the accompanying drawings illustrate the architecture, functionality, and operation of some possible implementations of apparatus, methods and computer program products according to various embodiments of the present disclosure. In this regard, each block in the flowchart or block diagrams may represent a module, segment, or portion of code, which comprises one or more executable instructions for implementing the specified logical function. It should also be noted that, in some alternative implementations, the functions noted in the block may occur out of the order noted in the figures. For example, two blocks shown in succession may be executed substantially in parallel, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination of the foregoing.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for operating an electronic device, comprising:
   determining whether a screenshot start condition is satisfied;
   performing automatic screenshot on a user interface of the electronic device to obtain a plurality of screenshots associated with the user interface of the electronic device in response to determining that the screenshot start condition is satisfied; and
   stopping the automatic screenshot on the user interface of the electronic device in response to determining that a screenshot stop condition is satisfied;

wherein the performing of the automatic screenshot on the user interface of the electronic device comprises: obtaining elapsed time for the automatic screenshot on the user interface of the electronic device in real time; and adjusting dynamically a time interval for the automatic screenshot on the user interface of the electronic device based on the elapsed time obtained in real time; wherein the adjusting dynamically of the time interval for the automatic screenshot on the user interface of the electronic device based on the elapsed time obtained in real time comprises: performing the automatic screenshot on the user interface of the electronic device at a first time interval when the elapsed time obtained in real time is within a first range; and performing the automatic screenshot on the user interface of the electronic device at a second time interval when the elapsed time obtained in real time is within a second range, wherein values in the first range are all less than values in the second range, and the first time interval is less than the second time interval.

2. The method according to claim 1, wherein the determining of whether the screenshot start condition is satisfied comprises: determining that the screenshot start condition is satisfied in response to receiving an automatic screenshot indication input for the user interface of the electronic device.

3. The method according to claim 1, further comprising: receiving an automatic screenshot indication input for the user interface of the electronic device; wherein the determining of whether the screenshot start condition is satisfied comprises: determining whether the user interface of the electronic device displays an application window when receiving the automatic screenshot indication input; determining whether the application window is allowed to be screen-captured in response to determining that the user interface of the electronic device displays the application window when receiving the automatic screenshot indication input; and determining that the screenshot start condition is satisfied in response to determining that the application window is allowed to be screen-captured.

4. The method according to claim 3, wherein the determining of whether the screenshot start condition is satisfied further comprises: determining that the screenshot start condition is satisfied in response to determining that the user interface of the electronic device does not displays the application window when receiving the automatic screenshot indication input.

5. The method according to claim 2, wherein the receiving of the automatic screenshot indication input for the user interface of the electronic device comprises: receiving a function menu call-out input for the user interface of the electronic device; displaying a function selection menu on the user interface of the electronic device in response to receiving the function menu call-out input, wherein the function selection menu comprises a screen recording and screenshot function option; and receiving a selection for the screen recording and screenshot function option.

6. The method according to claim 1, further comprising: receiving an automatic screenshot indication input for the user interface of the electronic device; wherein the determining of whether the screenshot start condition is satisfied comprises: obtaining a location of the automatic screenshot indication input on the user interface of the electronic device; determining whether the user interface of the electronic device at the location belongs to a text extractable area; and determining that the screenshot start condition is satisfied in response to determining that the user interface of the electronic device at the location does not belong to the text extractable area.

7. The method according to claim 6, wherein the receiving of the automatic screenshot indication input for the user interface of the electronic device comprises: receiving a function menu call-out input for the user interface of the electronic device; displaying a function selection menu on the user interface of the electronic device in response to receiving the function menu call-out input, wherein the function selection menu comprises a screen recording and screenshot function option; and receiving a selection for the screen recording and screenshot function option.

8. The method according to claim 6, further comprising: displaying a function selection menu on the user interface of the electronic device in response to determining that the user interface of the electronic device at the location belongs to the text extractable area, wherein the function selection menu comprises a screen recording and screenshot function option; receiving a selection for the screen recording and screenshot function option; and determining that the screenshot start condition is satisfied in response to receiving the selection for the screen recording and screenshot function option.

9. The method according to claim 1, wherein the second time interval is N times the first time interval, wherein N is a positive integer greater than 1, and the method further comprises: retaining one of screenshots and deleting other screenshots for every N screenshots associated with the user interface of the electronic device that are obtained in a state where the elapsed time is within the first range when the elapsed time obtained in real time is in the second range.

10. The method according to claim 1, further comprising: recording the user interface of the electronic device to obtain a video associated with the user interface of the electronic device in response to determining that the screenshot start condition is satisfied; and stopping the recording of the user interface of the electronic device in response to determining that the screenshot stop condition is satisfied.

11. The method according to claim 10, wherein: the performing of the automatic screenshot on the user interface of the electronic device comprises: not performing automatic screenshot of a screen recording window during the automatic screenshot on the user interface of the electronic device, wherein the screen recording window indicates that the user interface of the electronic device is being recorded; and the recording of the user interface of the electronic device comprises: not recording the screen recording window during the recording of the user interface of the electronic device.

12. The method according to claim 10, further comprising: determining whether the user interface of the electronic device is displaying a video playback application window corresponding to a video playback application during the automatic screenshot on the user interface of the electronic device, wherein the video playback application window comprises a video playback area;

wherein the performing of the automatic screenshot on the user interface of the electronic device comprises: only performing screenshot of the video playback area in response to determining that the user interface of the electronic device is displaying the video playback application window; and the recording of the user interface of the electronic device comprises: only recording the video playback area in response to determining that the user interface of the electronic device is displaying the video playback application window.

13. The method according to claim 10, further comprising:
displaying thumbnails of the plurality of screenshots and a thumbnail of the video on the user interface of the electronic device after stopping the screenshot on the user interface of the electronic device and stopping the recording of the user interface of the electronic device.

14. The method according to claim 13, further comprising:
determining a screenshot stop orientation, wherein the screenshot stop orientation is an orientation of the electronic device at the time when the screenshot on the user interface of the electronic device is stopped and the recording of the user interface of the electronic device is stopped; and
displaying the thumbnails of the plurality of screenshots and the thumbnail of the video on the user interface of the electronic device based on the screenshot stop orientation.

15. The method according to claim 13, further comprising:
receiving a first share input for a first share button and a first application option displayed on the user interface of the electronic device, wherein the first application option corresponds to a first application; and
sharing the plurality of screenshots and the video to the first application in response to the first share input.

16. The method according to claim 13, further comprising:
receiving a selection input for one or more thumbnails among the thumbnail of the video and the thumbnails of the plurality of screenshots;
selecting the one or more thumbnails in response to the selection input; and
deselecting the one or more thumbnails again in response to the selection input.

17. The method according to claim 16, further comprising:
receiving a puzzle input for a puzzle button displayed on the user interface of the electronic device when the one or more thumbnails are selected; and
generating a mosaic image for one or more screenshots of the plurality of screenshots corresponding to one or more selected thumbnails in response to the puzzle input, wherein the mosaic image spatially comprises one or more screenshots corresponding to the one or more selected thumbnails.

18. The method according to claim 17, wherein the generating the mosaic image for one or more screenshots of the plurality of screenshots corresponding to the one or more selected thumbnails comprises:
determining a number of selected thumbnails;
taking one screenshot corresponding to one selected thumbnail as the mosaic image if the number is equal to one;
generating the mosaic image by arranging one screenshot of a plurality of screenshots corresponding to a selected plurality of thumbnails in any one row of the mosaic image, and arranging two screenshots of the plurality of screenshots corresponding to the selected plurality of thumbnails in each of remaining rows of the mosaic image if the number is an odd number greater than one; and
generating the mosaic image by arranging two screenshots of the plurality of screenshots corresponding to the selected plurality of thumbnails in each row of the mosaic image if the number is an even number.

19. An electronic device, comprising:
a processor; and
a memory storing a program, the program comprising instructions that, when executed by the processor, cause the processor to:
determine whether a screenshot start condition is satisfied;
perform automatic screenshot on a user interface of the electronic device to obtain a plurality of screenshots associated with the user interface of the electronic device in response to determining that the screenshot start condition is satisfied; and
stop the automatic screenshot on the user interface of the electronic device in response to determining that a screenshot stop condition is satisfied;
wherein the instructions, when executed by the processor, cause the processor to: obtain elapsed time for the automatic screenshot on the user interface of the electronic device in real time;
and adjust dynamically a time interval for the automatic screenshot on the user interface of the electronic device based on the elapsed time obtained in real time;
wherein the instructions, when executed by the processor, cause the processor to: perform the automatic screenshot on the user interface of the electronic device at a first time interval when the elapsed time obtained in real time is within a first range; and perform the automatic screenshot on the user interface of the electronic device at a second time interval when the elapsed time obtained in real time is within a second range, wherein values in the first range are all less than values in the second range, and the first time interval is less than the second time interval.

20. A non-transitory storage medium storing a program, the program comprising instructions that, when executed by a processor of an electronic device, cause the electronic device to perform:
determine whether a screenshot start condition is satisfied;
perform automatic screenshot on a user interface of the electronic device to obtain a plurality of screenshots associated with the user interface of the electronic device in response to determining that the screenshot start condition is satisfied; and
stop the automatic screenshot on the user interface of the electronic device in response to determining that a screenshot stop condition is satisfied;
wherein the instructions, when executed by the processor of the electronic device, cause the electronic device to: obtain elapsed time for the automatic screenshot on the user interface of the electronic device in real time; and adjust dynamically a time interval for the automatic screenshot on the user interface of the electronic device based on the elapsed time obtained in real time;

wherein the instructions, when executed by the processor of the electronic device, cause the electronic device to: perform the automatic screenshot on the user interface of the electronic device at a first time interval when the elapsed time obtained in real time is within a first range; and perform the automatic screenshot on the user interface of the electronic device at a second time interval when the elapsed time obtained in real time is within a second range, wherein values in the first range are all less than values in the second range, and the first time interval is less than the second time interval.

\* \* \* \* \*